US012739633B2

(12) United States Patent
Kunz et al.

(10) Patent No.: US 12,739,633 B2
(45) Date of Patent: Sep. 15, 2026

(54) ATTRIBUTE-BASED CREDENTIALS FOR RESOURCE ACCESS

(71) Applicant: Lenovo (Singapore) Pte Ltd, Singapore (SG)

(72) Inventors: Andreas Kunz, Ladenburg (DE); Sheeba Backia Mary Baskaran, Friedrichsdorf (DE)

(73) Assignee: Lenovo (Singapore) Pte Ltd, Singapore (SG)

( * ) Notice: Subject to any disclaimer, the term of this patent is extended or adjusted under 35 U.S.C. 154(b) by 85 days.

(21) Appl. No.: 18/674,808

(22) Filed: May 24, 2024

(65) Prior Publication Data

US 2025/0365576 A1 Nov. 27, 2025

(51) Int. Cl.
*H04W 12/06* (2021.01)
*H04L 9/08* (2006.01)
(Continued)

(52) U.S. Cl.
CPC ......... *H04W 12/068* (2021.01); *H04L 9/0825* (2013.01); *H04L 63/18* (2013.01); *H04W 60/04* (2013.01)

(58) Field of Classification Search
CPC ........ H04W 12/06; H04L 9/08; H04L 9/0825; H04L 9/3213; H04L 2209/42; H04L 63/08; H04L 63/0876; H04L 63/18
See application file for complete search history.

(56) References Cited

U.S. PATENT DOCUMENTS 9,240,886 B1 * 1/2016 Allen ...................... H04L 63/08
11,076,288 B2 7/2021 Torvinen et al.
(Continued)

FOREIGN PATENT DOCUMENTS

CN 112600850 B 5/2022
CN 116318981 A 6/2023
(Continued)

OTHER PUBLICATIONS

Bernabe et al. "Holistic Privacy-Preserving Identity Management System for the Internet of Things" [Online],Aug. 8, 2017[Retrieved on: Dec. 13, 2025], Hindawi MIS, Retrieved from: (Year: 2017), < https://www.researchgate.net/profile/Jose-Hernandez-Ramos-2/publication/318983780_Holistic_Privacy-Preserving_Identity_Management_System_for_the_Internet_of_Things/links/59898da9a6fdcc75626357a3/Holistic-Privacy-Preserving-Identity-Management-System-for-the-Internet-of-Things.pdf > (Year: 2017).*
(Continued)

*Primary Examiner* — Eric W Shepperd
(74) *Attorney, Agent, or Firm* — FIG. 1 Patents

(57) ABSTRACT

Various aspects of the present disclosure relate to attribute-based credentials for resource access. An apparatus, such as a UE, communicates a registration request message for registration of the apparatus to a wireless communication network, the registration request message including a credentials indication associated with a credential. The apparatus receives a response message including a presentation policy for registration to the wireless communication network, and communicates a presentation token generated based at least in part on the presentation policy, the presentation token including proof information for a private key. The apparatus receives an authentication challenge, and generates, based at least in part on the authentication challenge, an authentication result using a root key and a subscription identity from the credential.

20 Claims, 20 Drawing Sheets

(51) Int. Cl.
*H04L 9/40* (2022.01)
*H04W 60/04* (2009.01)

(56) References Cited

U.S. PATENT DOCUMENTS

| | | | | |
|---|---|---|---|---|
| 12,155,781 | B1 | 11/2024 | Helfgott et al. | |
| 12,647,267 | B2 | 6/2026 | Kunz et al. | |
| 2006/0206932 | A1 | 9/2006 | Chong | |
| 2006/0235796 | A1 | 10/2006 | Johnson et al. | |
| 2017/0033934 | A1* | 2/2017 | Camenisch | H04L 9/3263 |
| 2017/0034142 | A1* | 2/2017 | Camenisch | H04L 9/3268 |
| 2019/0020480 | A1* | 1/2019 | Camenisch | H04L 9/3263 |
| 2019/0295069 | A1 | 9/2019 | Pala et al. | |
| 2020/0014535 | A1 | 1/2020 | Baskaran et al. | |
| 2021/0320788 | A1 | 10/2021 | Kang et al. | |
| 2021/0385216 | A1* | 12/2021 | Khalil | H04L 9/50 |
| 2022/0122170 | A1 | 4/2022 | Du | |
| 2022/0191044 | A1 | 6/2022 | Kurita | |
| 2022/0225093 | A1 | 7/2022 | Sasi et al. | |
| 2023/0031804 | A1 | 2/2023 | Shimizu et al. | |
| 2023/0164143 | A1 | 5/2023 | Richardson, IV et al. | |
| 2023/0224704 | A1* | 7/2023 | Atarius | H04L 9/3239 726/6 |
| 2023/0269095 | A1 | 8/2023 | Yamaoka et al. | |
| 2023/0412379 | A1* | 12/2023 | Yanai | H04L 9/3213 |
| 2023/0413060 | A1* | 12/2023 | Baskaran | H04L 9/3247 |
| 2024/0022433 | A1 | 1/2024 | Asor et al. | |
| 2024/0106834 | A1 | 3/2024 | Yamaoka | |
| 2024/0297798 | A1 | 9/2024 | Shimizuike et al. | |
| 2025/0131134 | A1 | 4/2025 | Giffard-burley et al. | |
| 2025/0159476 | A1 | 5/2025 | Torvinen et al. | |
| 2025/0217795 | A1 | 7/2025 | Modadugu et al. | |
| 2025/0365150 | A1 | 11/2025 | Kunz et al. | |

FOREIGN PATENT DOCUMENTS

| | | | |
|---|---|---|---|
| WO | 2022096125 | A1 | 5/2022 |
| WO | 2022096126 | A1 | 5/2022 |
| WO | 2023212051 | A1 | 11/2023 |
| WO | 2024162661 | A1 | 8/2024 |
| WO | 2024236072 | A1 | 11/2024 |
| WO | 2025099846 | A1 | 5/2025 |
| WO | 2025099848 | A1 | 5/2025 |

OTHER PUBLICATIONS

3GPP, "Security architecture and procedures for 5G system (Release 16)", 3GPP TS 33.501 V16.18.0, retrieved from the internet on May 20, 2024, <https://www.3gpp.org/ftp/Specs/archive/33_series/33.501/>, Mar. 2024, 257 pages.

ABC4TRUST , "Attribute-based Credentials for Trust", retrieved from the internet on May 20, 2024, <https://abc4trust.eu/download/flyer/ABC4Trust-OnePager-About-ABC4Trust.pdf>, Sep. 2011, 2 pages.

Bischsel , et al., "D2.2—Architecture for Attribute-based Credential Technologies—Final Version", retrieved from the internet on May 21, 2024, <https://abc4trust.eu/download/Deliverable_D2.2.pdf>, 2014, 149 pages.

Korenhof , et al., "The ABC of ABC: An analysis of attribute-based credentials in the light of data protection, privacy and identity", In J. B. Padullés, A. C. i Martínez, M. P. Poch, I. P. López, M. J. P. de Moner, & M. V. Solana (Eds.), Internet, Law and Politics: A decade of transformations (1 ed., vol. 10). Article 19 Huygens Editorial. <http://edcp.uoc.edu/proceedings_idp2014.pdf>, 2014, pp. 357-374.

"Non-Final Office Action", U.S. Appl. No. 18/674,804, filed Sep. 22, 2025, 14 pages.

"Security Architecture and Procedures for 5G System (Release 15)", 3GPP TS 33.501 version 15.18.0, Apr. 2024, 196 pages.

Hampiholi, et al., "Trusted self-enrolment for attribute-based credentials on mobile phones", Institute for Computing and Information Sciences, Proceedings of the IFIP Summer School, 2015, 13 pages.

Kakvi, et al., "SoK: Anonymous Credentials", International Conference on Research in Security Standardisation, Springer Nature Switzerland, Apr. 7, 2023, 23 pages.

Sporny, et al., "Verifiable Credentials Data Model v2.0", W3C Working Draft, [Retrieved Sep. 5, 2025]. Retrieved from the Internet: <https://www.w3.org/TR/2023/WD-vc-data-model-2.0-20230803/#dfn-verifiable-credential>, Mar. 16, 2023, 105 pages.

Yu, et al., "AAKA: An Anti-Tracking Cellular Authentication Scheme Leveraging Anonymous Credentials", Network and Distributed System Security (NDSS) Symposium, Feb. 26, 2024, 18 pages.

Zeydan, et al., "Decentralizing Authentication for Mobile Networks: Opportunities and Challenges in Web 3.0 Era", IEEE Wireless Communications, vol. 32, No. 1, Feb. 2025, 7 pages.

Corrected Notice of Allowability issued in U.S. Appl. No. 18/674,804, mailed Mar. 13, 2026, 2 pages.

Notice of Allowance issued in U.S. Appl. No. 18/674,804, mailed Feb. 4, 2026, 9 pages.

Corrected Notice of Allowability issed in U.S. Appl. No. 18/674,804, mailed May 8, 2026, 2 pages.

* cited by examiner

ATTRIBUTE-BASED CREDENTIALS FOR RESOURCE ACCESS

TECHNICAL FIELD

The present disclosure relates to wireless communications, and more specifically to attribute-based credentials for resource access, such as for access to a wireless communication network.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

As discussed herein, various terminology may be additionally or alternatively be used (e.g., interchangeably) to refer to similar concepts. For instance, the terms "transmit," "send," "communicate," "broadcast" may be used to refer to similar concepts. Further, the terms "receive," "obtain," "acquire" may be used to refer to similar concepts.

Some implementations of the method and apparatuses described herein may further include a UE for wireless communication to communicate a registration request message for registration of the UE to a wireless communication network, the registration request message including a credentials indication associated with a credential; receive a response message including a presentation policy for registration to the wireless communication network; communicate a presentation token generated based at least in part on the presentation policy, the presentation token including proof information for a private key; receive an authentication challenge; and generate, based at least in part on the authentication challenge, an authentication result using a root key and a subscription identity from the credential.

In some implementations of the method and apparatuses for a UE described herein, the registration request message includes a non-access stratum (NAS) registration request message and the response message include a NAS response message; the credentials indication includes an anonymous subscription concealed identifier (SUCI) including a network access identifier (NAI) for the wireless communication network; the presentation policy includes an indication to provide an encrypted subscription identifier, an encrypted root key, and a public key; the private key is associated with a public key included in the presentation token; the at least one processor is configured to cause the UE to communicate the presentation token via a NAS request; the at least one processor is configured to cause the UE to receive a NAS response including the authentication challenge and a presentation token success indication; the at least one processor is configured to cause the UE to derive the root key and the subscription identity; the root key and the subscription identity are included in the credential in an encrypted form, and wherein the at least one processor is configured to cause the UE to decrypt the root key and the subscription identity using the private key; the at least one processor is configured to cause the UE to perform a registration procedure with the wireless communication network based at least in part on the authentication result.

Some implementations of the method and apparatuses described herein may further include a processor for wireless communication to communicate a registration request message for registration of a UE to a wireless communication network, the registration request message including a credentials indication associated with a credential; receive a response message including a presentation policy for registration to the wireless communication network; communicate a presentation token generated based at least in part on the presentation policy, the presentation token including proof information for a private key; receive an authentication challenge; and generate, based at least in part on the authentication challenge, an authentication result using a root key and a subscription identity from the credential.

In some implementations of the method and apparatuses for a processor described herein, the registration request message includes a NAS registration request message and the response message include a NAS response message; the credentials indication includes an anonymous SUCI including a NAI for the wireless communication network; the presentation policy includes an indication to provide an encrypted subscription identifier, an encrypted root key, and a public key; the private key is associated with a public key included in the presentation token; at least one controller is configured to cause the processor to communicate the presentation token via a NAS request, and receive a NAS response including the authentication challenge and a presentation token success indication; the at least one controller is configured to cause the processor to derive the root key and the subscription identity; the root key and the subscription identity are included in the credential in an encrypted form, and wherein the at least one controller is configured to cause the processor to decrypt the root key and the subscription identity using the private key; the at least one controller is configured to cause the processor to perform a registration procedure with the wireless communication network based at least in part on the authentication result.

Some implementations of the method and apparatuses described herein may further include a method performed by a UE, the method including communicating a registration request message for registration of the UE to a wireless communication network, the registration request message including a credentials indication associated with a credential; receiving a response message including a presentation policy for registration to the wireless communication network; communicating a presentation token generated based at least in part on the presentation policy, the presentation token including proof information for a private key; receiving an authentication challenge; and generating, based at least in part on the authentication challenge, an authentication result using a root key and a subscription identity from the credential.

In some implementations of the method and apparatuses described herein, the method further comprising where the registration request message includes a NAS registration request message and the response message include a NAS response message; the credentials indication includes an anonymous SUCI including a NAI for the wireless communication network; the presentation policy includes an indication to provide an encrypted subscription identifier, an encrypted root key, and a public key; the private key is associated with a public key included in the presentation token; further including communicating the presentation token via a NAS request; further including receiving a NAS response including the authentication challenge and a presentation token success indication; further including deriving, via the UE, the root key and the subscription identity; the root key and the subscription identity are included in the credential in an encrypted form, and wherein the method further includes decrypting the root key and the subscription identity using the private key; further including performing a registration procedure with the wireless communication network based at least in part on the authentication result.

Some implementations of the method and apparatuses described herein may further include a network equipment (NE) for wireless communication to receive a registration request message for registration of a UE to a wireless communication network, the registration request message including a credentials indication associated with a credential; communicate a response message including a presentation policy for registration to the wireless communication network; receive a presentation token generated based at least in part on the presentation policy, the presentation token including proof information for a private key; receive, based at least in part on the presentation token, an authentication challenge; and communicate, to the UE, the authentication challenge associated with registration of the UE to the wireless communication network.

Some implementations of the method and apparatuses described herein may further include a method performed by a NE, the method including receiving a registration request message for registration of a UE to a wireless communication network, the registration request message including a credentials indication associated with a credential; communicating a response message including a presentation policy for registration to the wireless communication network; receiving a presentation token generated based at least in part on the presentation policy, the presentation token including proof information for a private key; receiving, based at least in part on the presentation token, an authentication challenge; and communicating, to the UE, the authentication challenge associated with registration of the UE to the wireless communication network.

DETAILED DESCRIPTION

Figure 1:
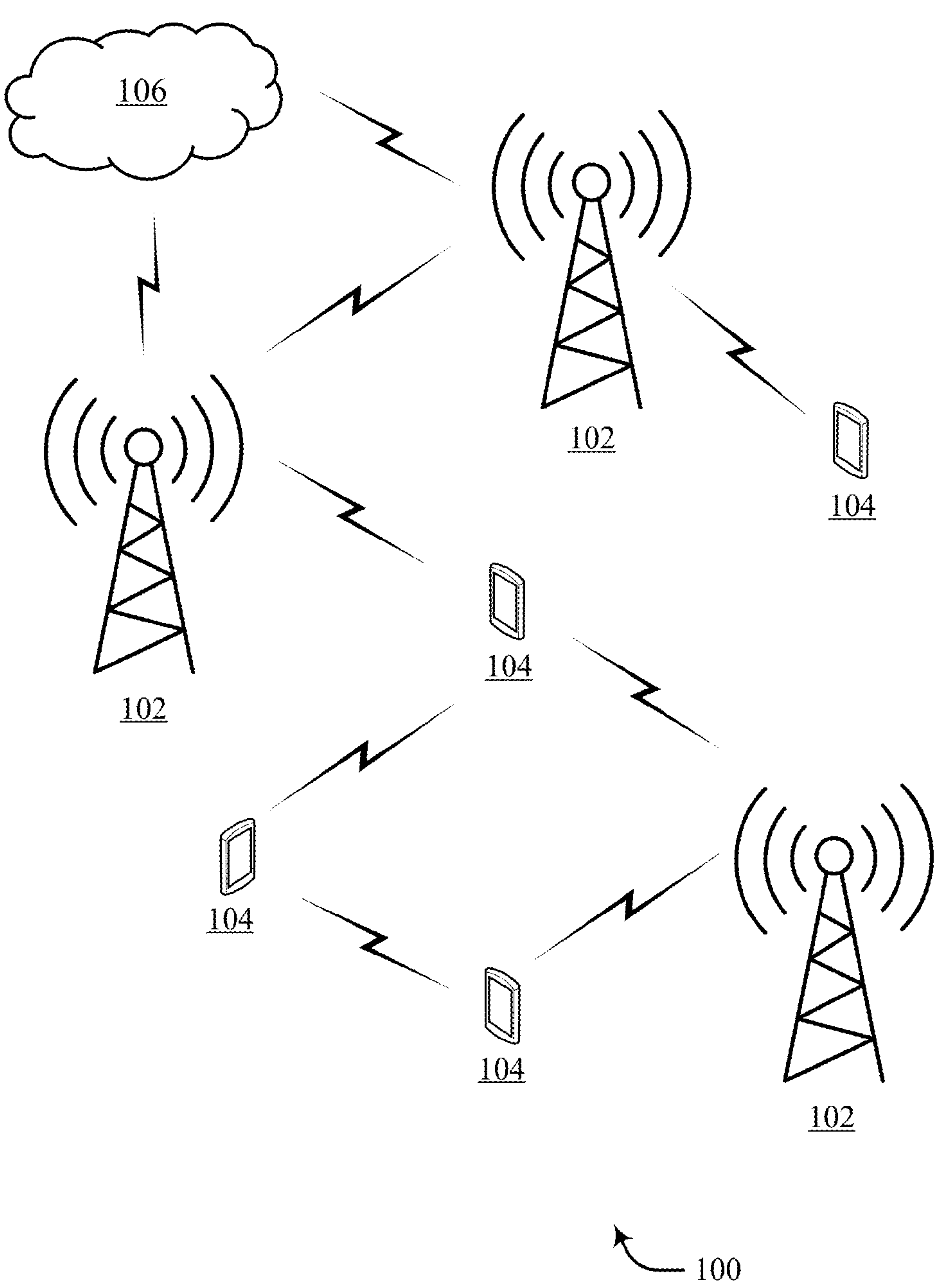
FIG. 1 illustrates an example of a wireless communications system in accordance with aspects of the present disclosure.

In a wireless communications system, a UE and a NE (e.g., a base station) may support wireless communication (e.g., reception and/or transmission of wireless communication) using time-frequency resources. Further, a UE may engage in a registration process with a NE to enable the UE to access a wireless communication network associated with the NE. As part of the registration process, the UE may exchange messages with the NE such as radio resource control (RRC) messages to request registration, identify the UE, perform UE authentication, and set up a secure connection to the NE for network access.

An example technique for a UE to access a wireless communication network involves universal subscriber identity module (USIM)-based access which a UE can utilize to authenticate with and access a wireless communication network. A USIM, for instance, stores information such as subscriber identities, authentication keys, and security contexts which are used to access wireless communication networks. In scenarios utilizing USIM, for example, a shared secret is kept in a tamper proof environment of the UE (e.g., USIM) and in a subscription database of a mobile network. A subscription for the UE can be associated with a particular mobile network operator, and UE access to other mobile networks can be performed via roaming. The shared secret, for example, resides within a home mobile network operator and only derived keys are shared for performing security procedures for mobile network access and NAS protocols in a serving network.

Other techniques outside of USIM based access have been considered for enabling mobile network access. For instance, attribute based credentials (ABC) (also referred to as anonymous credentials) can be used to access a specific resource (e.g., a mobile wireless communication network) without revealing knowledge of attributes based on a policy of a verifier that is managing the resource. An ABC policy may convert an attribute (e.g., birthday, phone number, email address, etc.) into a specific statement (e.g., "over 18 years old? yes or no") without disclosing the real birthday in the attribute. An ABC framework may involve certain entities (e.g., user, issuer, verifier, revocation authority, database, inspector, etc.) which are not provided in current ways for mobile network access authorization and subscription authentication. In ABC scenarios, for example, a user or subscriber may not be subscribed to a network operator and the user may obtain (e.g., purchase) "attributes" to access different networks (e.g., mobile networks, local networks (e.g., local access networks (LANs), etc.) and authenticate with the networks based on credentials the user receives from an issuer.

The notion of using ABC for accessing resources such as mobile networks, however, is fundamentally different from USIM based access and currently no solutions are provided to enable ABC for mobile network access and registration. For instance, one challenge involves the construction of ABCs to enable a UE to attach to different networks (e.g., mobile networks) based on attributes in the credential. Another challenge involves defining processes for a UE to utilize ABC for network registration and access.

Accordingly, aspects of the present disclosure are directed to enabling a UE to obtain (e.g., generate, receive) credentials (e.g., ABCs) and utilize the credentials to obtain network access, e.g., access to a wireless communication network. The UE, for example, may not be subscribed to the wireless communication network and may utilize credentials to authenticate with and access the wireless communication network. For instance, to obtain credentials, a UE may pre-generate attributes such as root keys and subscription identities within the context of the UE itself. The attributes can be encrypted with a public key (e.g., inspector public key) and signed by an issuer which can validate and issue the credential back to the UE. An issuer, for instance, represents an entity that may provide a service to the UE, such as a wireless communication network operator that may provide the UE with access to a wireless communication network. In an alternative or additional implementation, the UE may not generate at least some attributes and attribute generation can be triggered by an issuer and performed by a key generation function and/or inspector. The attributes may be encrypted with a first public key of the UE (e.g., a pseudonym of the UE) and with a second public key (e.g., an inspector public key) to enable the UE to decrypt the attributes. A signed credential that includes the encrypted attributes may be provided (e.g., received, transmitted) to the UE to enable the UE to utilize the signed credential to access resources such as a wireless communication network.

Aspects of the present disclosure also include techniques for using credentials (e.g., ABCs) for registering and authenticating a UE with a wireless communication network, e.g., via non third generation partnership project (3GPP) access without using USIM. The UE, for instance, may not be a subscriber of the wireless communication network, e.g., a unified data management (UDM) of the wireless communication network may not include subscription information for the UE. In example implementations the UE indicates a credential for network access in a wireless communication network registration request and sends (e.g., transmits, communicates) a presentation token according to a presentation policy of the wireless communication network. The presentation token includes an encrypted root key and an encrypted subscription identity which may be decrypted and provided to an authentication server function (AUSF) after successful verification of the presentation token. The wireless communication network, for example, may only have knowledge of a pseudonym (e.g., public key) of the UE. The UE may authenticate and register with the wireless communication network using the subscription identity and the root key, such as scenarios where the UE does not have a subscription permanent identifier (SUPI) and/or SUCI and a UDM record in a serving network of the wireless communication network. The UE may utilize the wireless communication network for wireless communication, such as for transmitting and receiving data wirelessly via the wireless communication network.

Accordingly, aspects of the present disclosure enable UEs to obtain secure access to resources such as wireless communication networks, such as in scenarios where the UEs may not be subscribed to the resources.

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a New Radio (NR) network, such as a 5G network, a 5G-Advanced (5G-A) network, or a 5G ultrawideband (5G UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UEs 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N6, or other network interface). In some implementations, the NE 102 may communicate with each other directly. In some other implementations, the NE 102 may communicate with each other indirectly (e.g., via the CN 106). In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a packet data network (PDN) gateway (P-GW), or a user plane function (UPF)). In some implementations, the control plane entity may manage NAS functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N6, or other network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kilohertz (kHz)) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0$, $\mu=1$, $\mu=2$, $\mu=3$, $\mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., orthogonal frequency division multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu$=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 megahertz (MHz)-7.125 gigahertz (GHz)), FR2 (24.25 GHz-52.6 GHZ), FR3 (7.125 GHZ-24.25 GHZ), FR4 (52.6 GHz-114.25 GHZ), FR4a or FR4-1 (52.6 GHz-71 GHZ), and FR5 (114.25 GHZ-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu$=0), which includes 15 kHz subcarrier spacing; a second numerology (e.g., $\mu$=1), which includes 30 kHz subcarrier spacing; and a third numerology (e.g., $\mu$=2), which includes 60 kHz subcarrier spacing. FR2 may be associated with one or multiple numerologies (e.g., at least 2 numerologies). For example, FR2 may be associated with a third numerology (e.g., $\mu$=2), which includes 60 kHz subcarrier spacing; and a fourth numerology (e.g., $\mu$=3), which includes 120 kHz subcarrier spacing.

According to implementations, one or more of the NEs 102 and the UEs 104 are operable to implement various aspects of the techniques described with reference to the present disclosure. For example, a UE 104 communicates, to a NE 102, a registration request message for registration of the UE 104 to a wireless communication network, the registration request message including a credentials indication associated with a credential. The UE 102 receives, from the NE 102, a response message including a presentation policy for registration to the wireless communication network. The UE 104 communicates, to the NE 102, a presentation token generated based at least in part on the presentation policy, the presentation token including proof information for a private key. The UE 104 receives, from the NE 102, an authentication challenge and generates, based at least in part on the authentication challenge, an authentication result using a root key and a subscription identity from the credential.

Some proposed network access scenarios using ABC frameworks are different than an access and registration to a mobile network which can be, in terms of a 3GPP compliant mobile network, based on a shared credential on a USIM which can be implemented in a device (e.g., UE) as a card or embedded chipset. The shared credential can allow a device to register and access a network from another serving network different than a home network when there is a roaming agreement between the operators. The basis for the security association can stem from the shared credential and not from an attribute based framework. Deriving a shared credential for network access from an attribute has not been discussed and there is currently no solution for this. Further, onboarding to a non-public network (NPN) is described in 3GPP technical specification (TS) 33.501 but without the use or issuance of ABC credentials.

Figure 2:
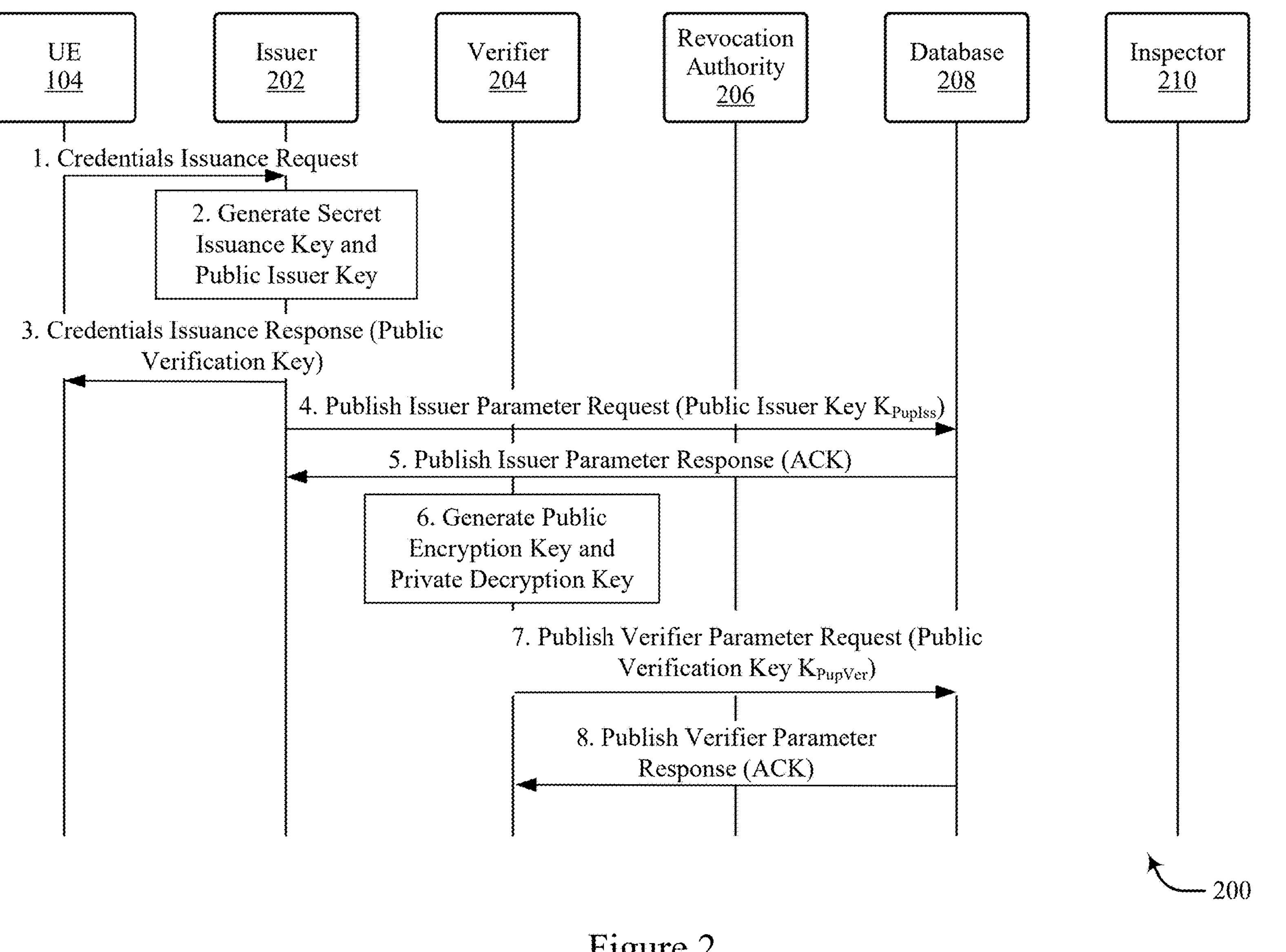
FIGS. 2 and 3 illustrate an example signaling diagram 200 for an attribute based credentials (ABC) framework.
Figure 3:
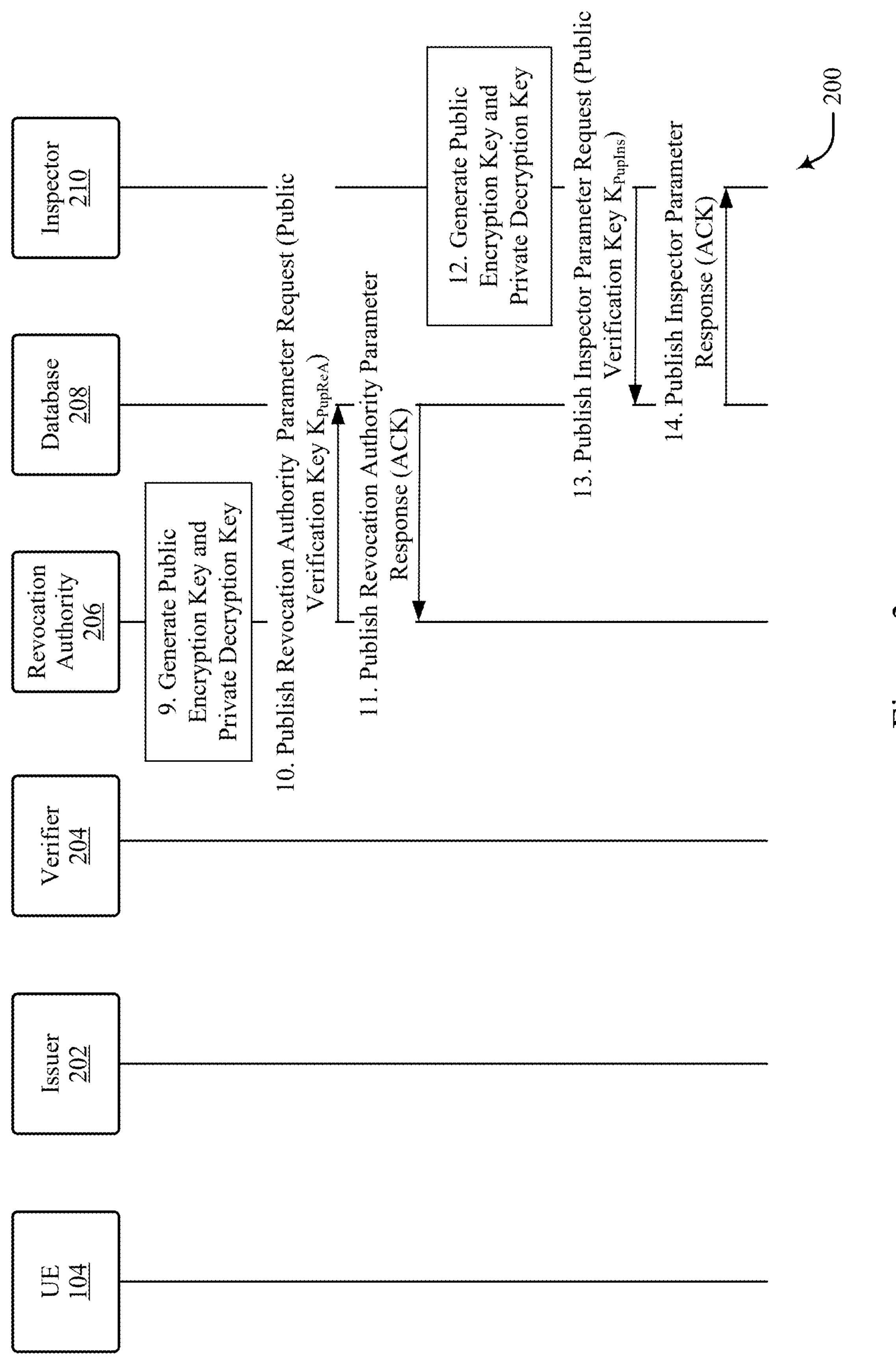

FIGS. 2 and 3 illustrate an example signaling diagram 200 for an ABC framework. The signaling diagram 200 may include a UE 104, an issuer 202, a verifier 204, a revocation authority 206, a database 208, and an inspector 210. The ABC framework involves that participants in the framework (e.g., UE 104, issuer 202, verifier 204, revocation authority 206, database 208, inspector 210) provide their public key in the database 208 and/or a blockchain as shown in the signaling diagram 200 as an example. For instance, the UE 104 has public keys and the issuer 202 has a public key and a private key. In scenarios only the UE 104 uses several public keys and other participants in the ABC framework have one public key and one private key. When a participant gets a request the participant can obtain a public key (e.g., from the database 208) and verify the request.

In scenarios the UE 104 determines to access a resource of the verifier 204, e.g., access to a wireless communication network. The verifier 204, for instance, can be a mobile network, a web resource (e.g., shopping site), a LAN, etc. Further, the verifier 204 may not have necessary information for the UE 104 and relies on a 3$^{rd}$ party which is trusted and can give relevant information for verification. The inspector 210 can decrypt basic information for accessing a mobile network, e.g., root key, subscription identity, etc. The revocation authority 206 maintains validity and/or revocation information for when a credential expires and/or a new credential may be needed. For instance, the verifier 204 can check with the revocation authority 206 regarding whether a credential is valid.

In scenarios the participants in the ABC framework have trusted access to the database 208, which may be implemented as a blockchain. With this access, participants can retrieve the corresponding public keys of the other participants in a communication. One prerequisite for network access is the retrieval of suitable ABC credentials from the issuer 202 after an onboarding procedure. For instance, devices (e.g., UE 104) can connect to an onboarding network for authentication and secure connection setup as well the secure provisioning of the long term credentials. The devices can initially attach to an onboarding network with default credentials and then retrieve their long-term credentials in the form of privacy-preserving ABC verifiable credentials from a provisioning sever. The ABC credentials can be implemented as a digital identity of a device that can be used for different purposes such as to authenticate in untrusted sub-networks and/or to derive proofs of device attributes that might be needed for access to network applications and/or wireless network services, and/or to authenticate and access directly other previously unknown devices (e.g., as long as the unknown devices also trust the issuer 202) in a device-to-device interaction.

Figure 4:
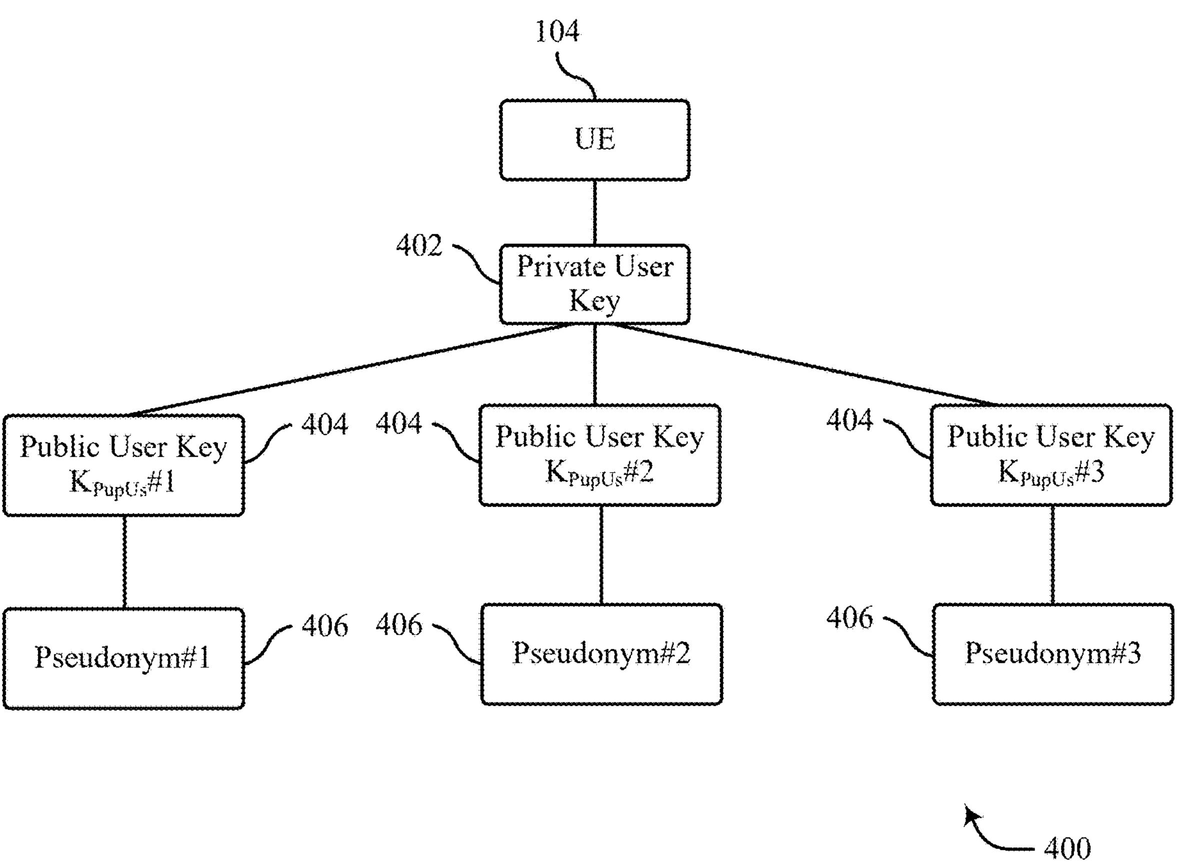
FIG. 4 illustrates an example scenario 400 showing example relationships between a private key, public keys, and pseudonyms.
Figure 10:
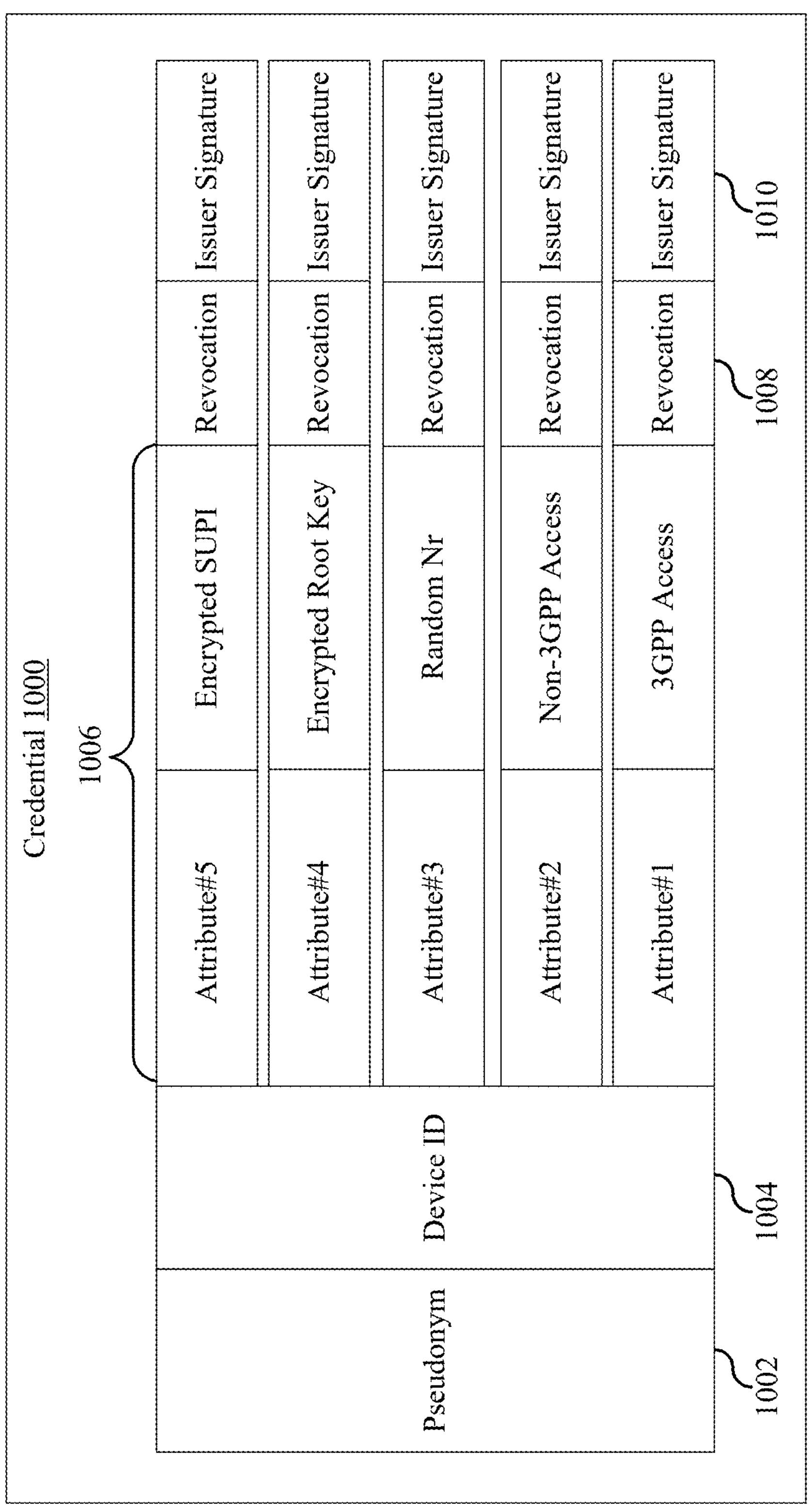
FIG. 10 illustrates an example of a credential 1000 in accordance with aspects of the present disclosure.
Figure 11:
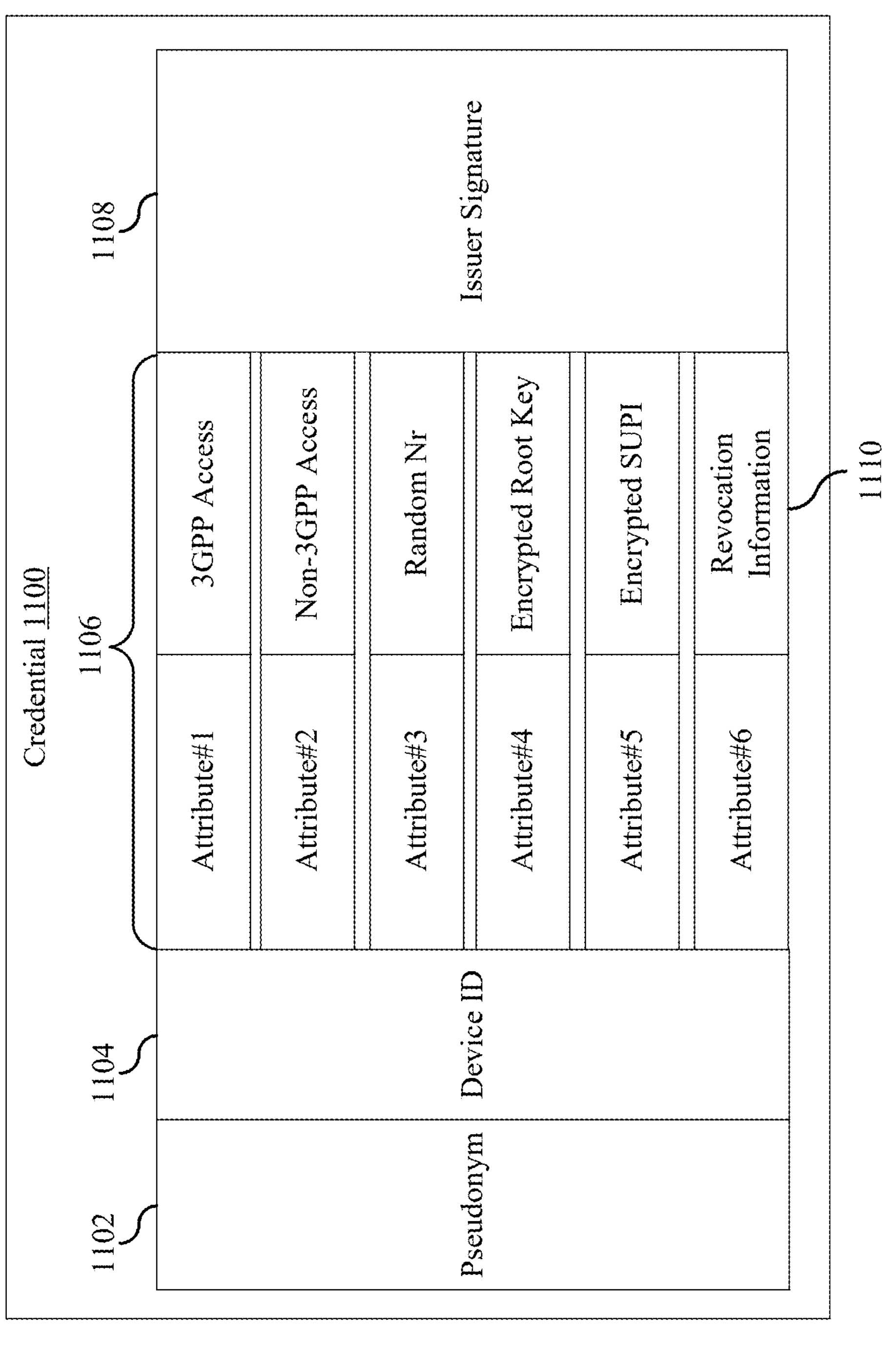
FIG. 11 illustrates an example of a credential 1100 in accordance with aspects of the present disclosure.

FIG. 4 illustrates an example scenario 400 showing example relationships between a private key, public keys, and pseudonyms. The scenario 400, for instance, includes a UE 104, a private key 402, public keys 404, and pseudonyms 406. According to implementations a pseudonym 406 used in a credential corresponds to a public key 404 of a device. A pseudonym 406, for instance, can be used as an identifier which can be used for security, signing, verifying, etc. Further, a user of the UE 104 can generate as many pseudonyms 406 as wanted. It can be assumed that the UE 104 generates a private key 402 and can generate an unlimited number of corresponding public keys 404 which are used as pseudonyms 406, such as shown in the scenario 400. The issuer 202 can sign the attributes individually (e.g., as shown in FIG. 10 below) and/or sign a whole set of attributes, e.g., as shown in FIG. 11 below. The attributes may include a pseudonym 406 as well as a device identity. In implementations the UE 104 can generate public keys 404 which correspond to pseudonyms 406.

Figure 5:
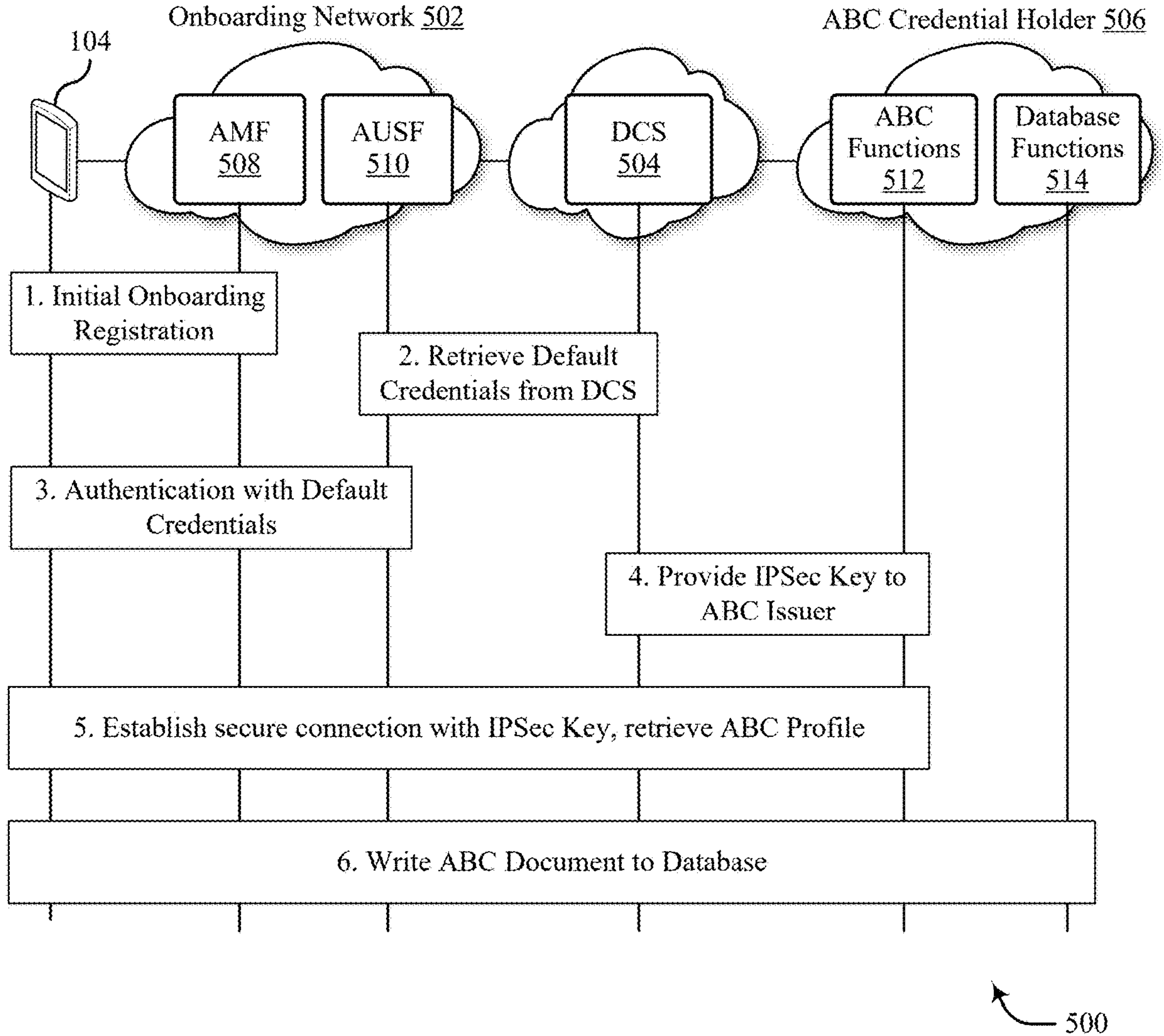
FIG. 5 illustrates a signaling diagram 500 showing a high-level implementation of onboarding and ABC profile provisioning.

FIG. 5 illustrates a signaling diagram 500 showing a high-level implementation of onboarding and ABC profile provisioning. The signaling diagram 500 may include a UE 104, a default credential server (DCS) 504, and an ABC credential holder 506. Further, the onboarding network 502 may include an AMF 508 and an AUSF 510, and the ABC credential holder 506 may include ABC functions 512 and database functions 514. In at least some scenarios the database functions 514 can be implemented as blockchain functions.

In the signaling diagram 500: 1. The UE 104 performs an initial onboarding to the onboarding mobile network 502 using default credentials. The default credentials, for instance, are preconfigured in the UE 104 and the UE 104 can be pre-provisioned with a profile to authenticate with the onboarding network 502. 2. The AUSF 510 retrieves default credentials from the DCS 504. The AUSF 510 may retrieve the default credentials only after authentication if the UE 104 authenticates directly with the DCS 504, e.g., the DCS 504 hosting an authorization, authentication, and accounting (AAA) Server.

Further to the signaling diagram 500: 3. The UE 104 authenticates and authorizes itself with the credentials hosted in the DCS 504. 4. The DCS 504 provides an IPsec key to the ABC credential holder 506 which is hosting the issuer as an ABC function 512 and a database function 514 and/or a blockchain for storage of the public key. 5. The UE 104 has limited internet protocol (IP) connectivity from the onboarding network 502 to the ABC issuer and establishes a protected IPsec connection to the issuer with the IPsec key. The UE 104 retrieves the ABC Profile(s). 6. The UE 104 writes the ABC document into the database functions 514 and/or a blockchain.

Accordingly, the present disclosure describes implementations for enabling a UE to obtain and utilize ABCs for network access to different network resources, such as a mobile communication network. Implementations, for example, provide ways for performing step 5 in the signaling diagram 500 described above. In examples the communication for a credential issuance procedure may be done over the secure IPsec connection between the UE 104 and an issuer, but can be carried out in other ways such as with a wireless local area network (WLAN) protected with mechanisms and protocols such as transport layer security (TLS), hypertext transfer protocol secure (HTTPS), etc.

Figure 6:
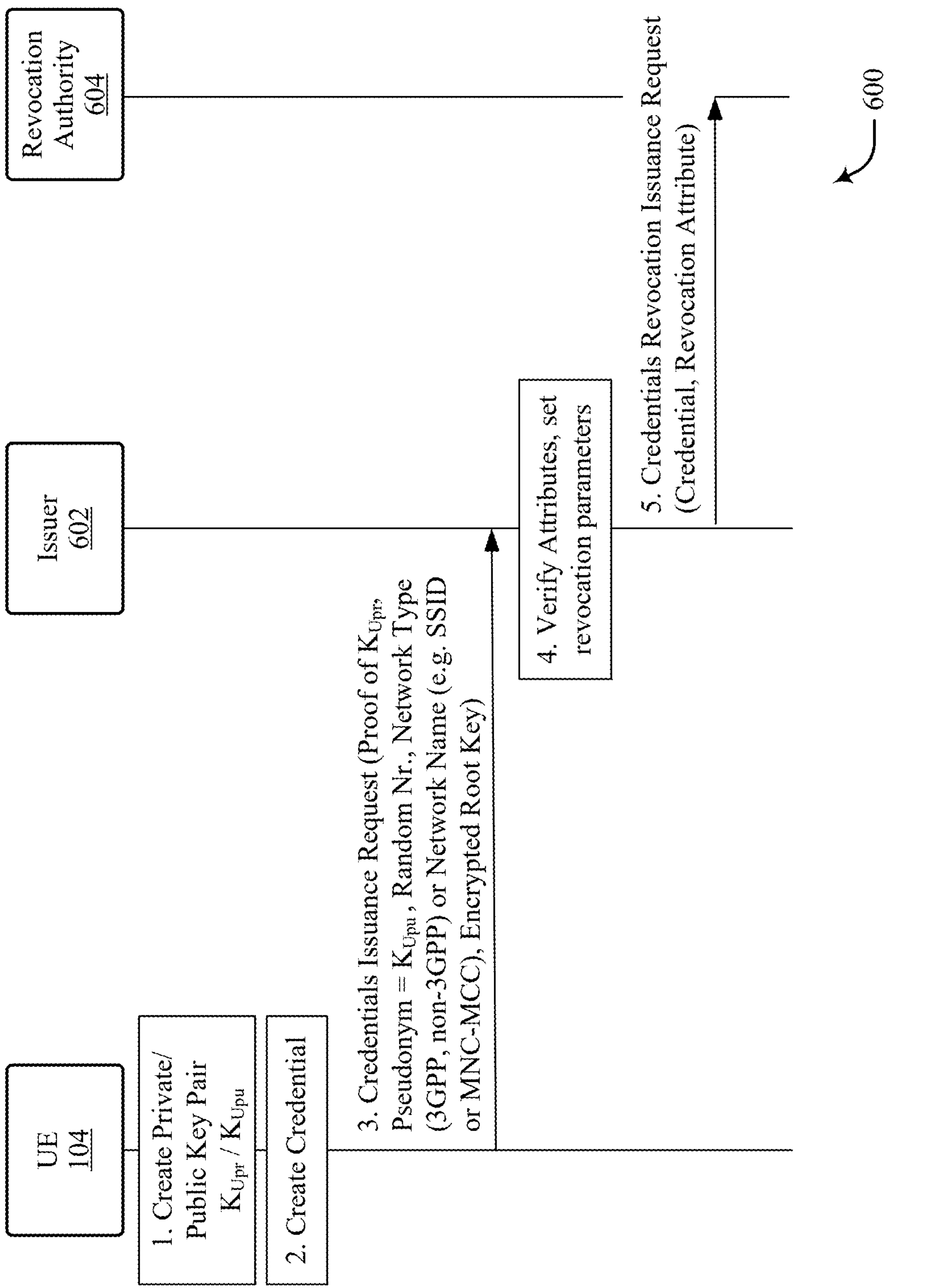
FIGS. 6 and 7 illustrate a signaling diagram 600 for a credential issuing procedure with UE generated keys and identities in accordance with aspects of the present disclosure.
Figure 7:
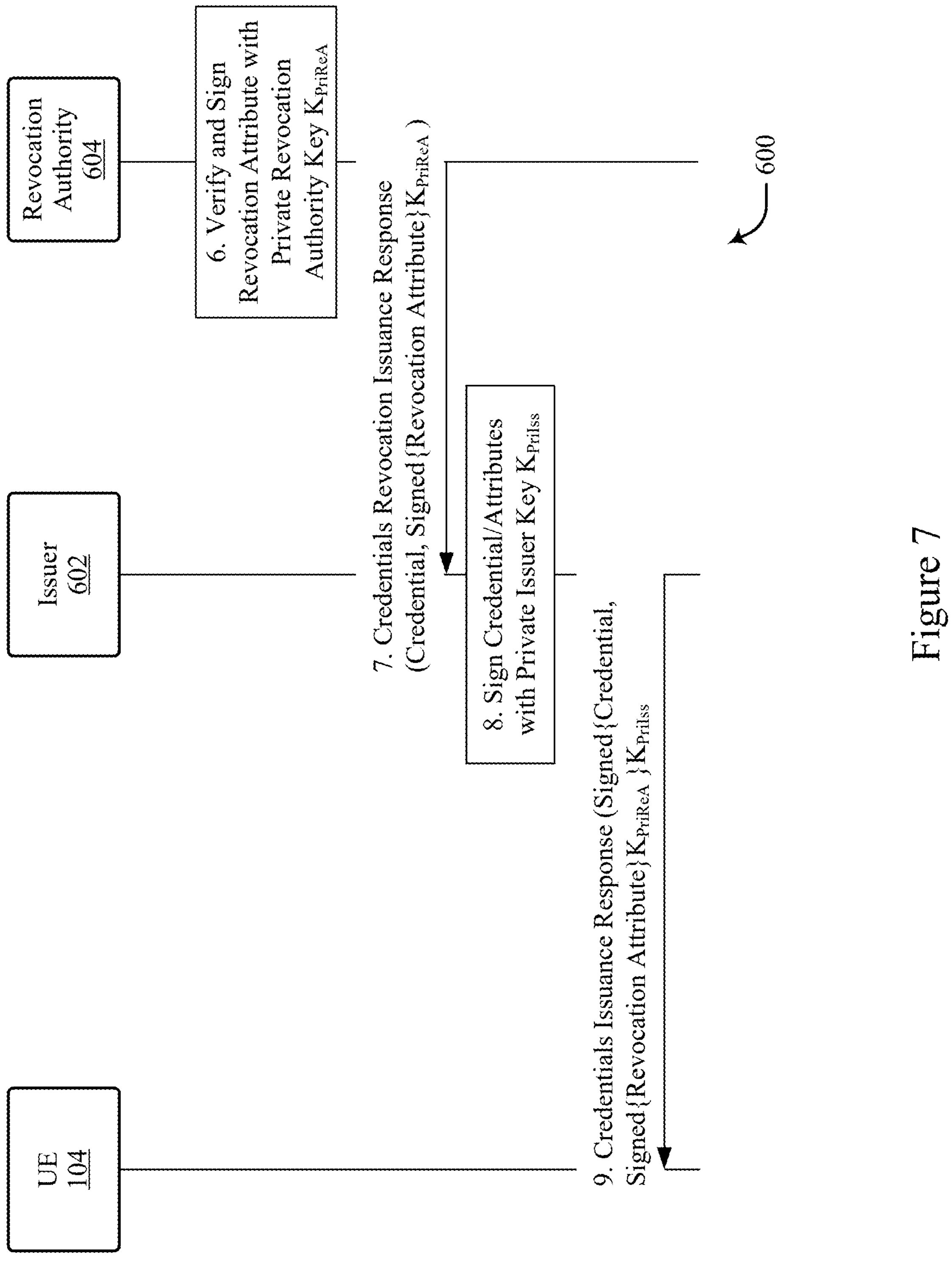

FIGS. 6 and 7 illustrate a signaling diagram 600 for a credential issuing procedure with UE generated keys and identities in accordance with aspects of the present disclosure. The signaling diagram 600 may include a UE 104, an issuer 602, and a revocation authority 604. In implementations, various aspects discussed with reference to the UE 104 can involve user assistance and/or user interaction with the UE 104. In implementations, attributes associated with a credential are encrypted with an inspector public key and signed by the issuer 602, which can validate and issue the credential back to the UE 104.

In the signaling diagram 600: 1. The UE 104 can generate a private key $K_{Upr}$ (e.g., a pseudonym) and a respective corresponding number of public keys $K_{Upu}$. The number of public keys, for instance, can be based on the number of credentials the UE 104 is to generate and/or a number of specific attributes that are to be bound to a single pseudonym. The UE 104 can generate information which gets signed by the issuer 602. In examples a credential can be service specific or used for multiple services, e.g., operators.

Further to the signaling diagram 600: 2. The UE 104 generates a credential (e.g., as illustrated in FIG. 10 and/or FIG. 11). FIGS. 10, 11, for instance, illustrate credentials after signing from the issuer 602, e.g., including attributes such as pseudonym of the UE 104 and/or a user, device identity, network type, network name, private key proof, a random number, etc. Further, the credentials may additionally or alternatively include other attributes such as user family and given names, user birthday, residential address, bank account information, etc. The UE 104 may generate a proof that it holds the private key of the included public key of the credential.

Different examples for generating a credential can include that the UE 104 generates a credential per network it determines to access and generates a unique root key per network name (e.g. service set identifier (SSID), mobile network code-mobile country code (MNC-MCC), etc.). Further, the UE 104 may use a different pseudonym per credential and/or the UE 104 may generate a different SUPI per network. Alternatively or additionally the UE 104 may have a 3GPP mobile network subscription and/or non-3GPP network subscription and generate one credential with one root key for multiple networks. The UE 104 may also generate one SUPI for multiple networks. The credential may be bound to one pseudonym or may not include a pseudonym, e.g., the UE 104 may change the pseudonym each time it accesses another network.

The random number may be included in the credential and may be used to compute the proof of the private key of the UE 104. The device identifier (ID) from the UE 104 e.g., a permanent equipment identifier (PEI)) may be included such as to bind the credential to a specific device. A UE generated root key $K_{Root}$ may be equivalent to Key (K, e.g., root key), ciphering key (CK), integrity key (IK), or extended master session key ((E)MSK), such as defined in Technical Specification (TS) 33.501. The UE 104 can encrypt the root key $K_{Root}$ with the public key of the inspector $K_{PupIns}$, e.g., Enc $\{K_{Root}\}$ $K_{PupIns}$.

Further to the signaling diagram 600: 3. The UE sends (e.g., transmits, communicates) a credential issuance request to the issuer 602. The credential issuance request message may be protected with an IPsec connection between the UE 104 and issuer 602 and/or using client (e.g., browser) webserver security such as TLS, HTTPS, etc. The UE 104 may have subscribed or be in the process of subscribing online to 3GPP and/or non-3GPP network access with different packages of different providers, e.g., 10 gigabits (Gbit) for one week at operator XY. The credential issuance request may include this information, which can be included in a revocation attribute. This step may be associated with a purchase operation of a web-based enterprise include defining the contract details.

Further to the signaling diagram 600: 4. The issuer 602 verifies the information in the credential, e.g., similar to other procedures such as checking passport information, purchasing information, etc. The issuer 602 can set the revocation parameters of the credential according to the service the UE 104 has purchased. At least some attributes can be revocable, e.g., a root key can have a revocation parameter such as expiration time and/or date. 5. The issuer 602 sends (e.g., transmits, communicates) a credential revocation issuance request to the revocation authority 604 with the credential and the revocation attribute with the revocation parameters. 6. The revocation authority 604 verifies and stores the revocation attribute and signs it with the revocation authority private key $K_{PriReA}$, e.g., signed{Revocation Attribute}$K_{PriReA}$. 7. The revocation authority 604 provides (e.g., transmits, sends, communicates) the signed revocation attribute back to the issuer 602. 8. The issuer 602 signs the attributes of the credential either individually (e.g., FIG. 10) or together (e.g., FIG. 11). 9. The issuer 602 responds (e.g., transmits, sends, communicates) to the UE 104 with a credential issuance response containing the signed credential by the issuer 602 which includes the signed revocation attribute by the revocation authority 604.

Figure 8:
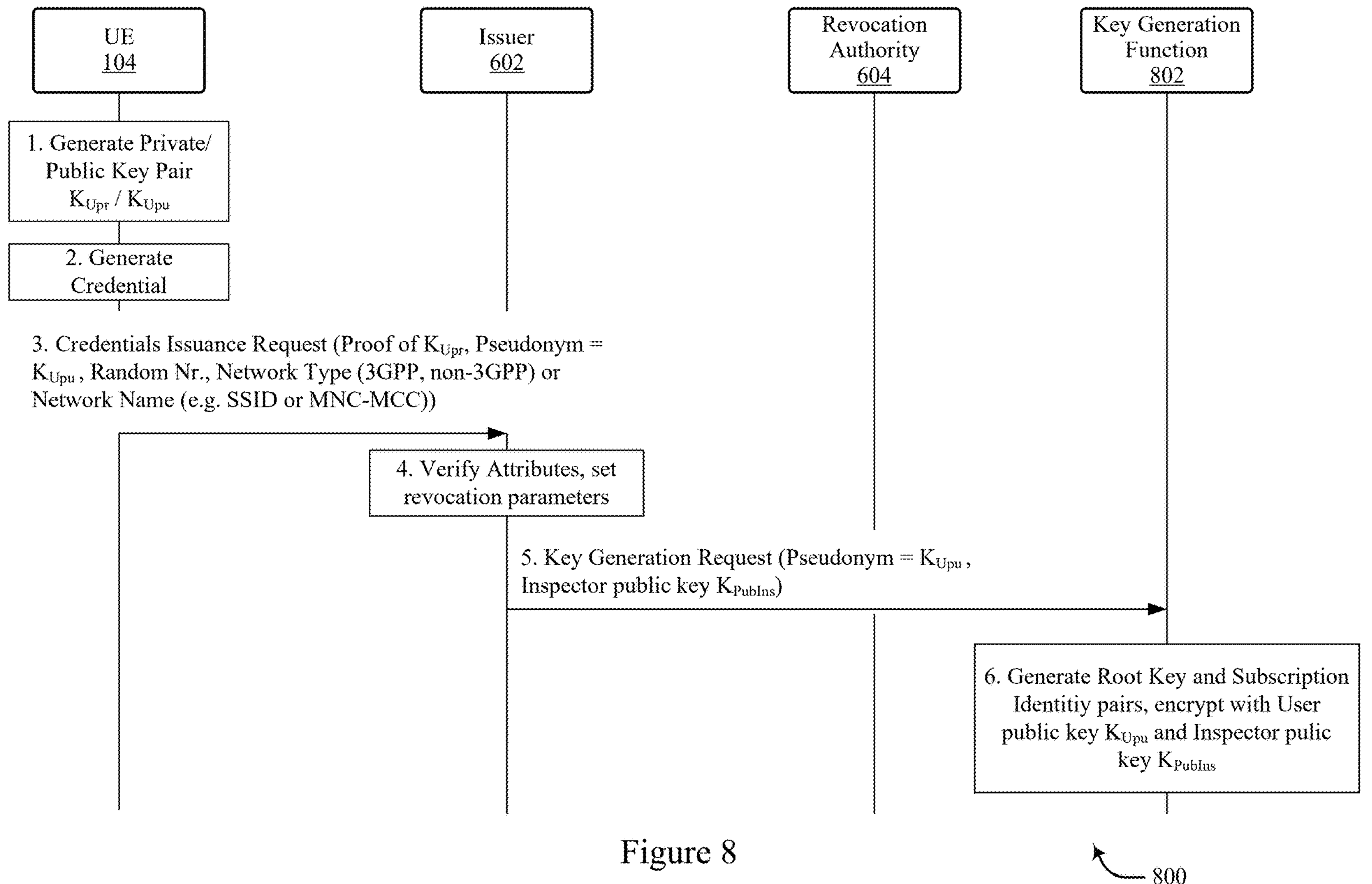
FIGS. 8 and 9 illustrate a signaling diagram 800 for a credential issuing procedure with network generated keys and identities in accordance with aspects of the present disclosure.
Figure 9:
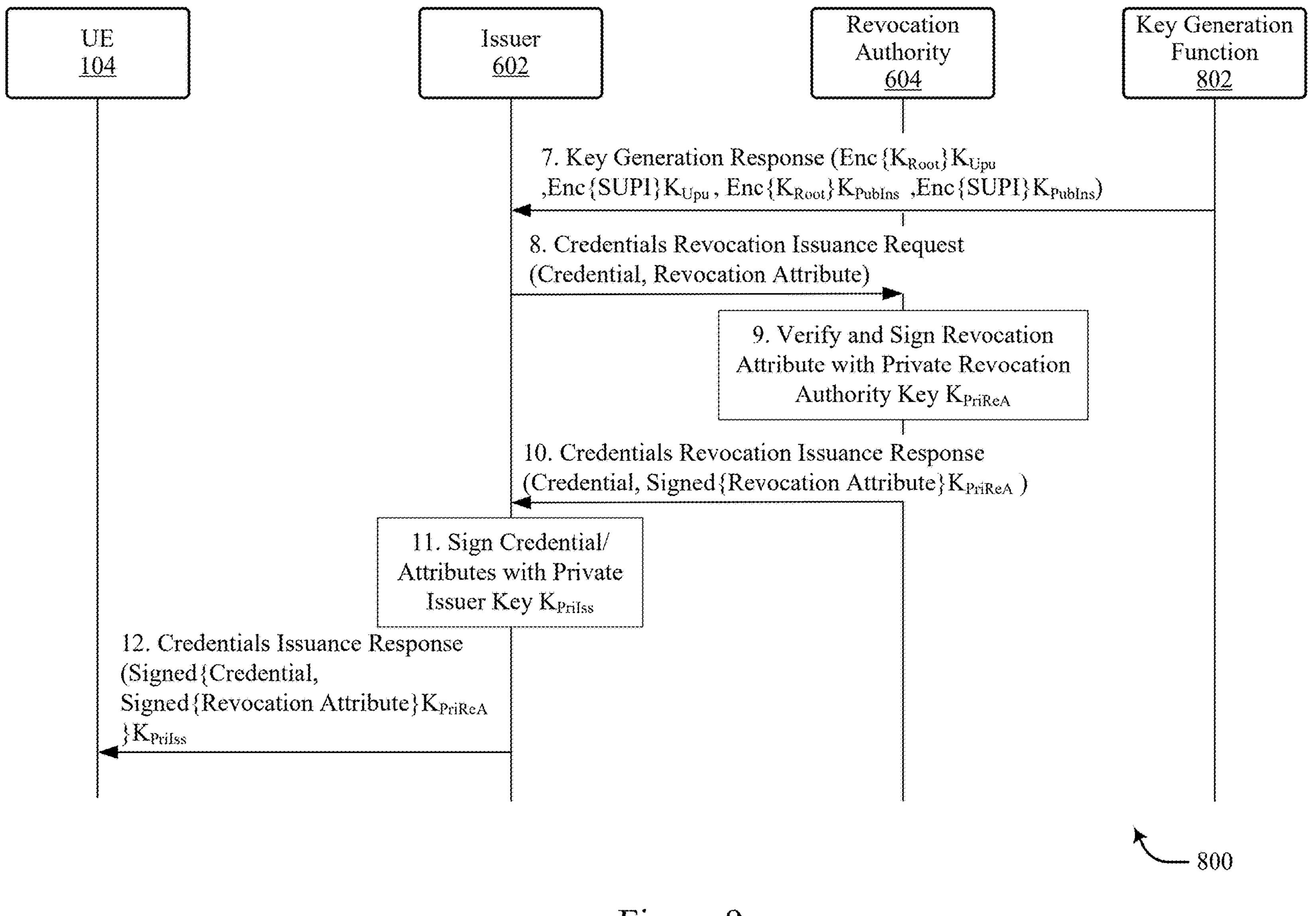

FIGS. 8 and 9 illustrate a signaling diagram 800 for a credential issuing procedure with network generated keys and identities in accordance with aspects of the present disclosure. The signaling diagram 800 may include a UE 104, an issuer 602, a revocation authority 604, and a key generation function 802. In implementations, various aspects discussed with reference to the UE 104 can involve user assistance and/or user interaction with the UE 104.

In the signaling diagram 800: 1. The UE 104 generates private key $K_{Upr}$ and a respective corresponding number of Public Keys $K_{Upu}$, e.g., based on the number of credentials the UE 104 is to generate and/or the number of specific attributes that are to be bound to a single pseudonym, e.g., public key. The UE 104 can send (e.g., transmit, communicate) a credential request and associated information and can get issued with a root key and a subscription identity.

Further to the signaling diagram 800: 2. The UE 104 generates a credential (e.g., as illustrated in FIG. 10 and/or FIG. 11). FIGS. 10, 11, for instance, illustrate credentials after signing from the issuer 602, e.g., including attributes such as pseudonym of the UE 104 and/or a user, device identity, network type, network name, private key proof, a random number, etc. Further, the credentials may additionally or alternatively include other attributes such as user family and given names, user birthday, residential address, bank account information, etc. The UE 104 may generate a proof that it holds the private key of the included public key of the credential.

Different examples of a credential can include that the UE 104 generates a credential per network and may use a different pseudonym per credential, and/or the UE 104 may have a 3GPP mobile network subscription or non 3GPP network subscription and may use a single pseudonym or may not include a pseudonym. For instance, the UE 104 may change the pseudonym each time it accesses another network. The random number may be included in the credential and may be used to compute a proof of the private key of the UE 104. The device ID from the UE 104 may be included (e.g., a PEI) to associate the credential to a specific device.

Further to the signaling diagram 800: 3. The UE 104 sends (e.g., transmits, communicates) a credential issuance request to the issuer 602. This message may be protected with the IPsec connection between the UE 104 and issuer 602 and/or using client (e.g., web browser) webserver security like TLS, HTTPS, etc. The UE 104 may have subscribed or is in the process of subscribing online to 3GPP and/or non-3GPP network access of different packages of different providers, e.g., 10 Gbit for one week at operator XY. The credential issuance request may include this information, which can be included in a revocation attribute. In at least one example this step may include a purchase operation of a web-based enterprise entity with defining contract details. 4. The issuer 602 can verify the information in the credential, e.g., with procedures such as checking passport information or purchasing information, etc. The issuer 602 can set the revocation parameters of the credential according to the service purchased by the UE 104.

Further to the signaling diagram 800: 5. The issuer 602 sends (e.g., transmits, communicates) a key generation request to the key generation function 802 including the UE Public Key(s) $K_{Upu}$, which corresponds to the pseudonym(s) and the public key of an inspector, e.g., the key generation function 802. The key generation function 802, for instance, may be implemented as an inspector. 6. The key generation function 802 can generate a pair of root key $K_{Root}$ and subscription identity SUPI per pseudonym in the request message. The generated root key $K_{Root}$ may be equivalent to K, CK, IK, or the (E)MSK, such as defined in TS 33.501. The key generation function 802 encrypts the root key $K_{Root}$ with the public key of the inspector $K^{PupIns}$ (e.g., Enc{$K_{Root}$}$K_{PupIns}$) and with the public key of the UE 104 and/or user $K_{Upu}$, e.g., Enc{$K_{Root}$}$K_{Upu}$. The key generation function 802 can encrypt the subscription identity SUPI similarly, e.g., with the public key of the inspector (e.g., $K_{PupIns}$, e.g., Enc{SUPI}$K_{PupIns}$) and with the public key of the UE 104 and/or user $K_{Upu}$, e.g., Enc{SUPI}$K_{Upu}$. A SUPI and root key can also be encrypted together and included in one attribute, e.g., instead of two attributes. If the key generation function 802 is implemented as an inspector, the key generation function 802 may sign all encrypted keys with the inspector private key.

Further to the signaling diagram 800: 7. The key generation function 802 sends (e.g., transmits, communicates) a key generation response with the encrypted root key $K_{Root}$ and subscription identity SUPI pairs to the issuer 602. 8. The issuer 602 sends e.g., transmits, communicates) a credential revocation issuance request to the revocation authority 604 with the credential and the revocation attribute with the revocation parameters. 9. The revocation authority 604 verifies and stores the revocation attribute and signs it with the revocation authority private key $K_{PriReA}$, e.g., signed{Revocation Attribute}$K_{PriReA}$. 10. The revocation authority 604 provides (e.g., transmits, sends, communicates) the signed revocation attribute back to the issuer 602. 11. The issuer 602 can include the encrypted root key $K_{Root}$ and subscription identity SUPI pairs in one or separate attributes in the credential. The issuer 602 can sign the attributes of the credential either individually (e.g., FIG. 10) or together (e.g., FIG. 11). 12. The issuer 602 can respond (e.g., transmit, send, communicate) to the UE 104 with a credential issuance response including the signed credential by the issuer 602 which includes the signed revocation attribute by the revocation authority 604. The UE 104 can then decrypt the root key pair and subscription identity with the private key. Based on a pseudonym used, the UE 104 can determine for which network(s) the UE 104 can apply the root key and the subscription identity.

FIG. 10 illustrates an example of a credential 1000 in accordance with aspects of the present disclosure. The credential 1000, for instance, may represent an instance of an ABC credential. The credential 1000 may include a pseudonym 1002 (e.g., a public key), a device ID 1004, attributes 1006, revocation information 1008, and issuer signatures 1010. Examples of the attributes 1006 in the credential 1000 include the pseudonym of a user and/or UE (e.g., a user/UE public key), device identity, revocation information, network type, network name, UE and/or user private key proof, a random number, encrypted root key with the inspector public key, encrypted subscription identity such as SUPI encrypted with the inspector public key. Other examples of the attributes 1006 include user family and given names, user birthday, residential address, bank account information, etc. The root key may correspond to root keys such as K, CK, IK, etc., used for authentication procedures such as specified in TS 33.501.

In the credential 1000, for example, the issuer 602 can sign each attribute 1006 and the revocation information 1008 is included per attribute 1006. In implementations this can enable the UE 104 to compile a presentation token with less than the required attributes 1006 from the credential 1000 and include only attributes 1006 requested in a presentation policy.

FIG. 11 illustrates an example of a credential 1100 in accordance with aspects of the present disclosure. The credential 1100, for instance, may represent an instance of an ABC credential. The credential 1100 may include a pseudonym 1102 (e.g., a public key), a device ID 1104, attributes 1106, and an issuer signature 1108. Examples of the attributes 1106 in the credential 1100 include the pseudonym of a user and/or UE (e.g., a user/UE public key), device identity, revocation information, network type, network name, UE and/or user private key proof, a random number, encrypted root key with the inspector public key, encrypted subscription identity such as SUPI encrypted with the inspector public key. Other examples of the attributes 1106 include user family and given names, user birthday, residential address, bank account information, etc. The root key may correspond to root keys such as K, CK, IK, etc., used for authentication procedures such as specified in TS 33.501. In the credential 1100 an issuer 602 can sign all attributes 1106 with a single issuer signature 1108 and revocation information 1110 is included as an individual attribute 1106.

The present disclosure also provides solutions for enabling a UE to register with a wireless communication network using credentials, e.g., credentials such as obtained according to implementations described above.

Figure 12:
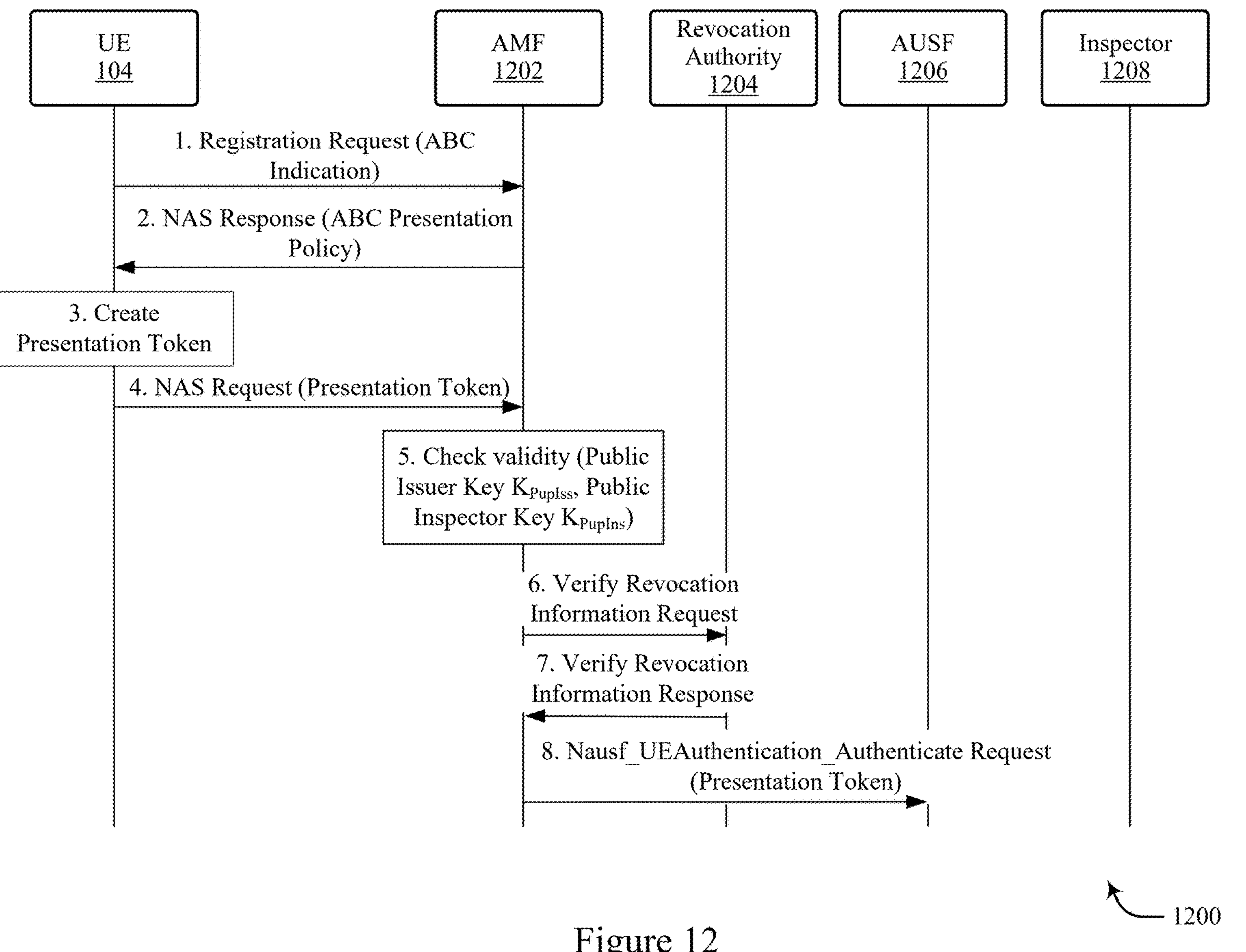
FIGS. 12 and 13 illustrate a signaling diagram 1200 in accordance with aspects of the present disclosure.
Figure 13:
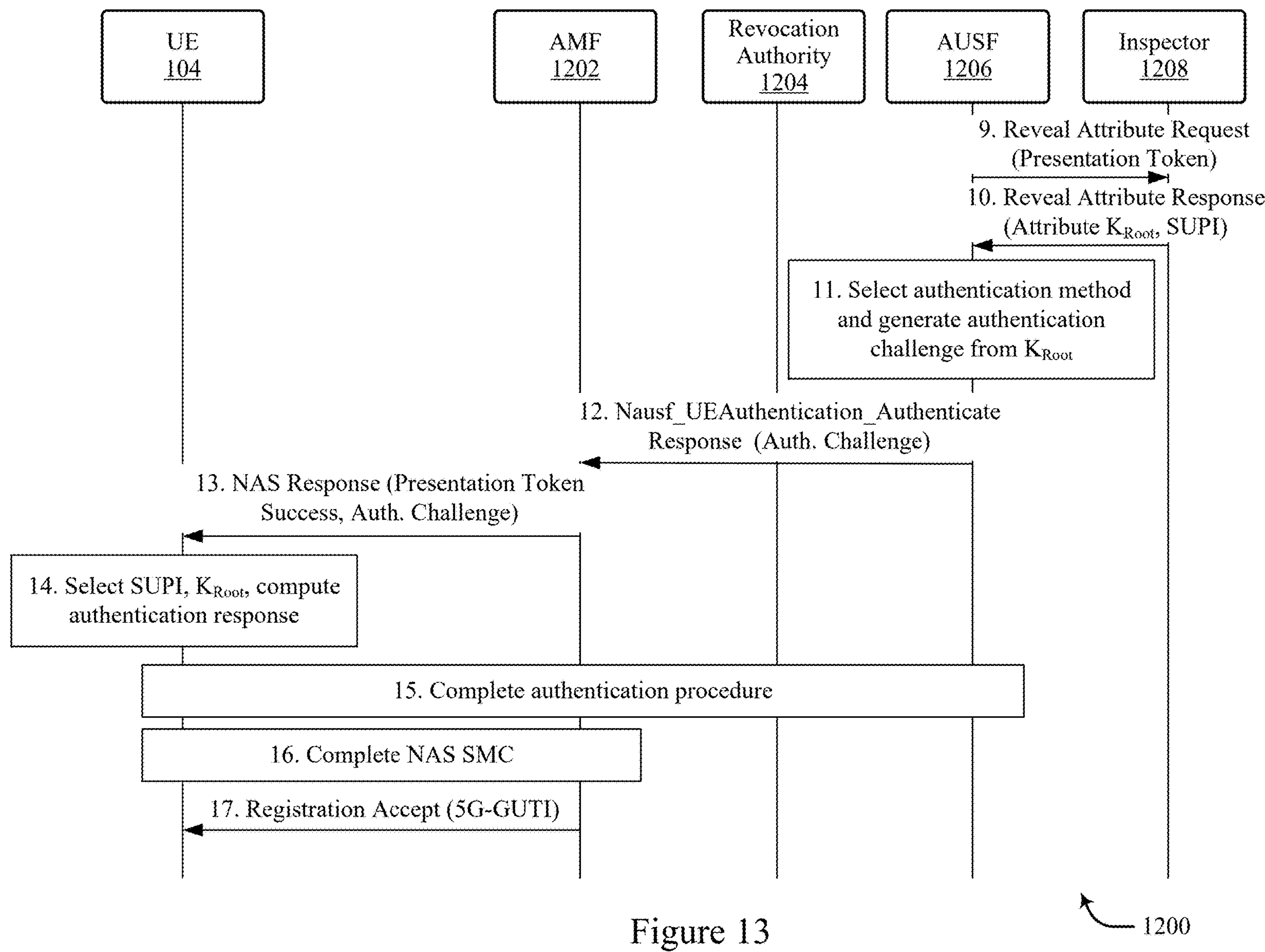

FIGS. 12 and 13 illustrate a signaling diagram 1200 in accordance with aspects of the present disclosure. The signaling diagram 1200 includes a UE 104, an AMF 1202, a revocation authority 1204, an AUSF 1206, and an inspector 1208. The AMF 1202 may alternatively or additionally be implemented as a security anchor function (SEAF). The signaling diagram 1200, for instance, illustrates a registration procedure using an ABC credential for authentication and registration to a network. The UE 104, for example, is provisioned with the ABC credential from an issuer (e.g., as described above) for network access. The UE 104 may not have a SUCI, e.g., since a SUCI points to a UDM instance where the SUPI is located. Further, where the UE 104 may not be a subscriber of the mobile network, there may be no data record in a UDM for a subscription such as SUPI and root key.

In the signaling diagram 1200: 1. The UE 104 communicates (e.g., transmits, sends) a NAS registration request to the AMF 1202, indicating that the UE 104 is requesting to connect with ABC credentials. The UE 104 may include an anonymous SUCI (e.g. anonymous@operator.xy) with the NAI of the network. 2. The AMF 1202 replies (e.g., transmits, sends, communicates) with a NAS response and a presentation policy for registering to the network with ABC credentials. The presentation policy may specify that the UE 104 is to construct the presentation token in a specific way and to include specific attributes for the mobile network operator. Examples of the attributes include but are not limited to: encrypted SUPI, encrypted root key, issuer public key, inspector public key, revocation parameters, requested services (e.g., IP connectivity, IP multimedia subsystem (IMS) services, etc.), Quality of Service (QoS) profile, etc.

Further to the signaling diagram 1200: 3. The UE 104 can create a presentation token according to the presentation policy. The UE 104 may include a proof that it holds the private key corresponding to the pseudonym used in the presentation token. 4. The UE 104 can send (e.g., transmit, communicate) a NAS request to the AMF 1202 including the presentation token. 5. The AMF 1202 can check the validity of the presentation token, which can be performed by verifying the signatures of the attributes signed by the issuer with the public key of the Issuer $K_{PupIss}$ and, if available, the attributes signed by the inspector with the public key $K_{PupIns}$ of the inspector. The AMF 1202 may also check the proof of the private key of the UE 104 with the pseudonym in the credentials.

Further to the signaling diagram 1200: 6. The AMF 1202 can send (e.g., transmit, communicate) a verify revocation information request to the revocation authority 1204, which may be sent via a network exposure function (NEF). The request may include the presentation token from the UE 104, which may include attributes revocation information signed by the issuer, and/or may include a revocation attribute signed by the revocation authority 1204. 7. The revocation authority 1204 can verify the request from the AMF 1202 with information stored at the time the credential was issued by the issuer and verify whether the credential is still valid. The revocation authority 1204 can provide the verification (s) in a verify revocation information response the result to the AMF 1202, e.g., whether the credential is still valid and additional information about the service, e.g., remaining data volume, remaining time, etc. 8. If the credential is not revoked, the AMF 1202 can send (e.g., transmit, communicate) a Nausf_UEAuthentication_Authenticate request message to the AUSF 1206 including the presentation token. Alternatively or additionally the AMF 1202 may only include the encrypted attributes related to the root key and the subscription identity.

Further to the signaling diagram 1200: 9. The AUSF 1206 can query the inspector 1208 with a reveal attribute request message, including the presentation token or alternatively the encrypted attributes related to the root key and the subscription identity. This message may be sent (e.g., transmitted, communicated) via the NEF. 10. The inspector 1208 can verify the request, the presentation token, and/or the encrypted attributes. Since root key and subscription identity may be encrypted with inspector public key, the inspector 1208 may have its own private key that it uses to decrypt root key and subscription identity. In scenarios where the inspector 1208 issued and signed the encrypted attributes, the inspector 1208 may verify the signature and decrypt the encrypted attributes, e.g., root key $K_{Root}$ and subscription identity SUPI. The inspector 1208 can communicate (e.g., transmit, send) a reveal attribute response message to the AUSF 1206 including the decrypted attributes, e.g., the root key $K_{Root}$ and subscription identity SUPI. 11. The AUSF 1206 may not query the UDM and selects an authentication method. Extensible authentication protocol-authentication and key agreement (EAP-AKA') may be used such as based on whether the user purchased ABC credential access with non-3GPP networks and uses the ABC credential access on devices not supporting the NAS protocol. In implementations no queries to the UDM may be made for de-concealment of the SUPI since the UE 104 may not be a subscriber of the mobile operators and thus the UE 104 may not have a record in the UDM and the inspector 1208 performs decryption of the root key and the SUPI. The AUSF 1206 can create an authentication challenge, such as specified in TS 33.501.

Further to the signaling diagram 1200: 12. The AUSF 1206 can send (e.g., transmit, communicate) a Nausf_UEAuthentication_Authenticate response to the AMF 1202 including the authentication challenge. 13. The AMF 1202 can send the authentication challenge to the UE 104 in a NAS message. The AMF 1202 can include a presentation token success indication in the NAS Message. 14. The UE 104 can select the root key $K_{Root}$ and the SUPI for the mobile network, e.g., according to the credential previously issued from the issuer. If $K_{Root}$ and SUPI were encrypted in the credential with the pseudonym of the UE 104, the UE can decrypt the $K_{Root}$ and SUPI with its private key $K_{Upr}$. The UE 104 can compute the authentication result from the authentication challenge, e.g., as specified in TS 33.501. 15. The UE 104 can perform the authentication procedure and AUSF 1206 and UE 104 can derive the keys accordingly. 16. The AMF 1202 can perform a NAS security mode command procedure. 17. After the security procedures are completed, the AMF 1202 can send (e.g., transmits, communicate) a NAS registration accept message to the UE 104 including a 5G-globally unique temporary UE identity (GUTI). The UE 104 can use the 5G-GUTI for further requests.

Figure 14:
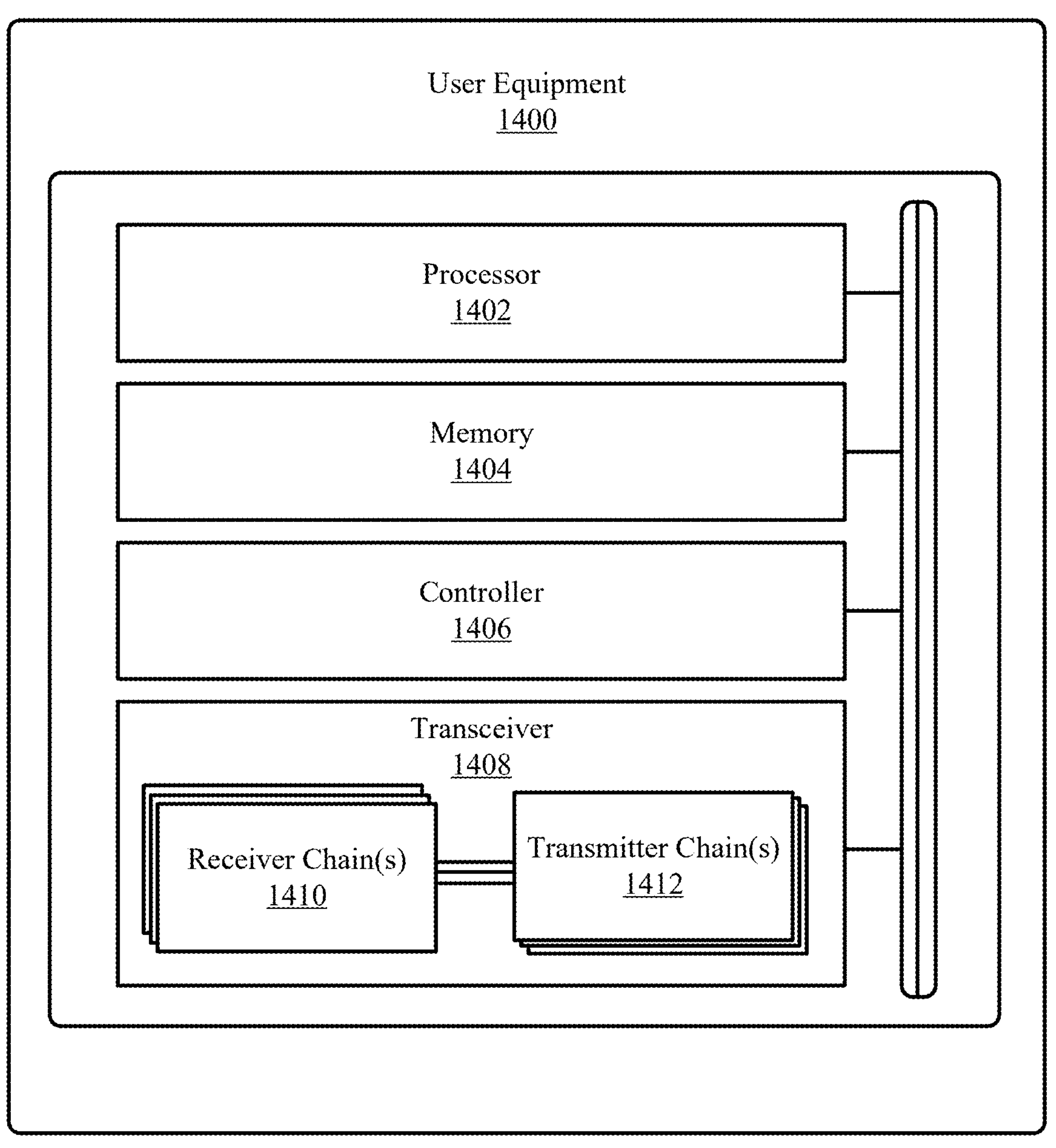
FIG. 14 illustrates an example of a UE 1400 in accordance with aspects of the present disclosure.

FIG. 14 illustrates an example of a UE 1400 in accordance with aspects of the present disclosure. The UE 1400 may include a processor 1402, a memory 1404, a controller 1406, and a transceiver 1408. The processor 1402, the memory 1404, the controller 1406, or the transceiver 1408, or various combinations thereof or various components thereof may be examples of means for performing various aspects of the present disclosure as described herein. These components may be coupled (e.g., operatively, communicatively, functionally, electronically, electrically) via one or more interfaces.

The processor 1402, the memory 1404, the controller 1406, or the transceiver 1408, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1402 may include an intelligent hardware device (e.g., a general-purpose processor, a DSP, a central processing unit (CPU), an ASIC, a field programmable gate array (FPGA), or any combination thereof). In some implementations, the processor 1402 may be configured to operate the memory 1404. In some other implementations, the memory 1404 may be integrated into the processor 1402. The processor 1402 may be configured to execute computer-readable instructions stored in the memory 1404 to cause the UE 1400 to perform various functions of the present disclosure.

The memory 1404 may include volatile or non-volatile memory. The memory 1404 may store computer-readable, computer-executable code including instructions when executed by the processor 1402 cause the UE 1400 to perform various functions described herein. The code may be stored in a non-transitory computer-readable medium such as the memory 1404 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1402 and the memory 1404 coupled with the processor 1402 may be configured to cause the UE 1400 to perform one or more of the functions described herein (e.g., executing, by the processor 1402, instructions stored in the memory 1404). For example, the processor 1402 may support wireless communication at the UE 1400 in accordance with examples as disclosed herein. The UE 1400 may be configured to or operable to support a means for communicating a registration request message for registration of the UE to a wireless communication network, the registration request message including a credentials indication associated with a credential; receiving a response message including a presentation policy for registration to the wireless communication network; communicating a presentation token generated based at least in part on the presentation policy, the presentation token including proof information for a private key; receiving an authentication challenge; and generating, based at least in part on the authentication challenge, an authentication result using a root key and a subscription identity from the credential.

Additionally, the UE 1400 may be configured to support any one or combination of where the registration request message includes a NAS registration request message and the response message include a NAS response message; the credentials indication includes an anonymous SUCI including a NAI for the wireless communication network; the presentation policy includes an indication to provide an encrypted subscription identifier, an encrypted root key, and a public key; the private key is associated with a public key included in the presentation token; further including communicating the presentation token via a NAS request; further including receiving a NAS response including the authentication challenge and a presentation token success indication; further including deriving, via the UE, the root key and the subscription identity; the root key and the subscription identity are included in the credential in an encrypted form, and wherein the method further includes decrypting the root key and the subscription identity using the private key; further including performing a registration procedure with the wireless communication network based at least in part on the authentication result.

Additionally, or alternatively, the UE 1400 may support at least one memory (e.g., the memory 1404) and at least one processor (e.g., the processor 1402) coupled with the at least one memory and configured to cause the UE to communicate a registration request message for registration of the UE to a wireless communication network, the registration request message including a credentials indication associated with a credential; receive a response message including a presentation policy for registration to the wireless communication network; communicate a presentation token generated based at least in part on the presentation policy, the presentation token including proof information for a private key; receive an authentication challenge; and generate, based at least in part on the authentication challenge, an authentication result using a root key and a subscription identity from the credential.

Additionally, the UE 1400 may be configured to support any one or combination of where the registration request message includes a NAS registration request message and the response message include a NAS response message; the credentials indication includes an anonymous SUCI including a NAI for the wireless communication network; the presentation policy includes an indication to provide an encrypted subscription identifier, an encrypted root key, and a public key; the private key is associated with a public key included in the presentation token; the at least one processor is configured to cause the UE to communicate the presentation token via a NAS request; the at least one processor is configured to cause the UE to receive a NAS response including the authentication challenge and a presentation token success indication; the at least one processor is configured to cause the UE to derive the root key and the subscription identity; the root key and the subscription identity are included in the credential in an encrypted form, and wherein the at least one processor is configured to cause the UE to decrypt the root key and the subscription identity using the private key; the at least one processor is configured to cause the UE to perform a registration procedure with the wireless communication network based at least in part on the authentication result.

The controller 1406 may manage input and output signals for the UE 1400. The controller 1406 may also manage peripherals not integrated into the UE 1400. In some implementations, the controller 1406 may utilize an operating system such as iOS®, ANDROID®, WINDOWS®, or other operating systems. In some implementations, the controller 1406 may be implemented as part of the processor 1402.

In some implementations, the UE 1400 may include at least one transceiver 1408. In some other implementations, the UE 1400 may have more than one transceiver 1408. The transceiver 1408 may represent a wireless transceiver. The transceiver 1408 may include one or more receiver chains 1410, one or more transmitter chains 1412, or a combination thereof.

A receiver chain 1410 may be configured to receive signals (e.g., control information, data, packets) over a wireless medium. For example, the receiver chain 1410 may include one or more antennas to receive a signal over the air or wireless medium. The receiver chain 1410 may include at least one amplifier (e.g., a low-noise amplifier (LNA)) configured to amplify the received signal. The receiver chain 1410 may include at least one demodulator configured to demodulate the receive signal and obtain the transmitted data by reversing the modulation technique applied during transmission of the signal. The receiver chain 1410 may include at least one decoder for decoding the demodulated signal to receive the transmitted data.

A transmitter chain 1412 may be configured to generate and transmit signals (e.g., control information, data, packets). The transmitter chain 1412 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1412 may also include at least one power amplifier configured to amplify the modulated signal to an appropriate power level suitable for transmission over the wireless medium. The transmitter chain 1412 may also include one or more antennas for transmitting the amplified signal into the air or wireless medium.

Figure 15:
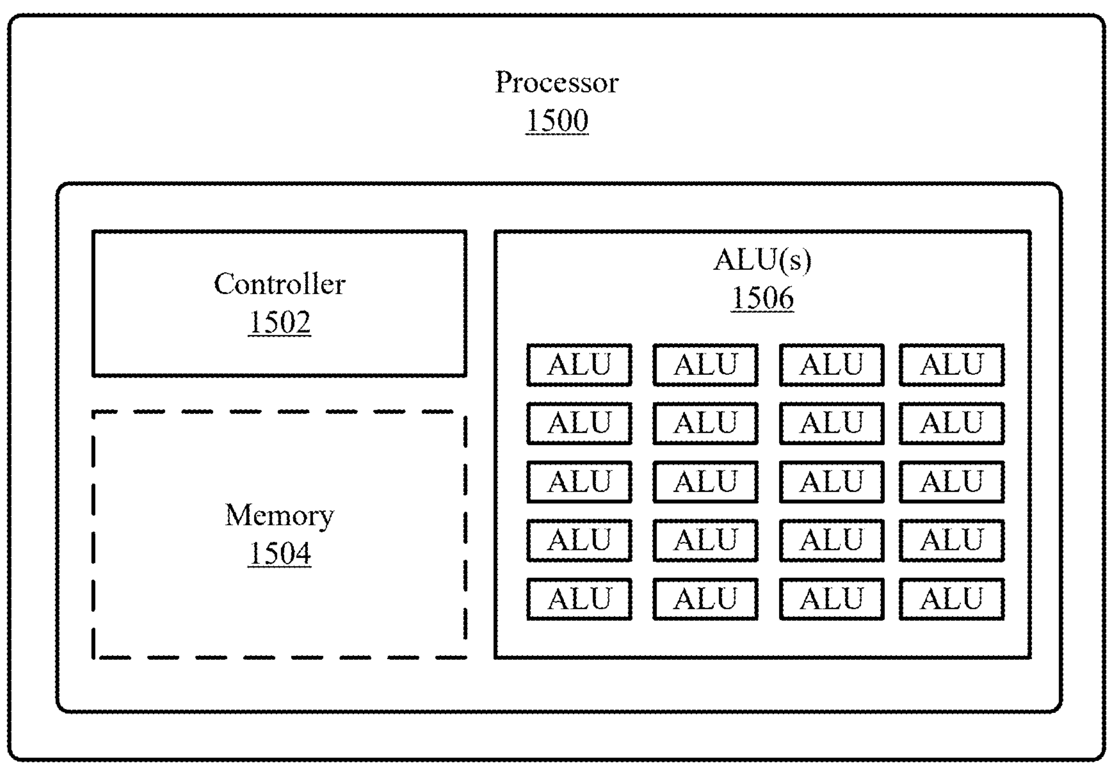
FIG. 15 illustrates an example of a processor 1500 in accordance with aspects of the present disclosure.

FIG. 15 illustrates an example of a processor 1500 in accordance with aspects of the present disclosure. The processor 1500 may be an example of a processor configured to perform various operations in accordance with examples as described herein. The processor 1500 may include a controller 1502 configured to perform various operations in accordance with examples as described herein. The processor 1500 may optionally include at least one memory 1504, which may be, for example, a level 1 (L1), level 2 (L2), or level 3 (L3)_cache. Additionally, or alternatively, the processor 1500 may optionally include one or more arithmetic-logic units (ALUs) 1506. One or more of these components may be in electronic communication or otherwise coupled (e.g., operatively, communicatively, functionally, electronically, electrically) via one or more interfaces (e.g., buses).

The processor 1500 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 1500) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 1502 may be configured to manage and coordinate various operations (e.g., signaling, receiving, obtaining, retrieving, transmitting, outputting, forwarding, storing, determining, identifying, accessing, writing, reading) of the processor 1500 to cause the processor 1500 to support various operations in accordance with examples as described herein. For example, the controller 1502 may operate as a control unit of the processor 1500, generating control signals that manage the operation of various components of the processor 1500. These control signals include enabling or disabling functional units, selecting data paths, initiating memory access, and coordinating timing of operations.

The controller 1502 may be configured to fetch (e.g., obtain, retrieve, receive) instructions from the memory 1504 and determine subsequent instruction(s) to be executed to cause the processor 1500 to support various operations in accordance with examples as described herein. The controller 1502 may be configured to track memory addresses of instructions associated with the memory 1504. The controller 1502 may be configured to decode instructions to determine the operation to be performed and the operands involved. For example, the controller 1502 may be configured to interpret the instruction and determine control signals to be output to other components of the processor 1500 to cause the processor 1500 to support various operations in accordance with examples as described herein. Additionally, or alternatively, the controller 1502 may be configured to manage flow of data within the processor 1500. The controller 1502 may be configured to control transfer of data between registers, ALUs 1506, and other functional units of the processor 1500.

The memory 1504 may include one or more caches (e.g., memory local to or included in the processor 1500 or other memory, such as RAM, ROM, DRAM, SDRAM, SRAM, MRAM, flash memory, etc. In some implementations, the memory 1504 may reside within or on a processor chipset (e.g., local to the processor 1500). In some other implementations, the memory 1504 may reside external to the processor chipset (e.g., remote to the processor 1500).

The memory 1504 may store computer-readable, computer-executable code including instructions that, when executed by the processor 1500, cause the processor 1500 to perform various functions described herein. The code may be stored in a non-transitory computer-readable medium such as system memory or another type of memory. The controller 1502 and/or the processor 1500 may be configured to execute computer-readable instructions stored in the memory 1504 to cause the processor 1500 to perform various functions. For example, the processor 1500 and/or the controller 1502 may be coupled with or to the memory 1504, the processor 1500, and the controller 1502, and may be configured to perform various functions described herein. In some examples, the processor 1500 may include multiple processors and the memory 1504 may include multiple memories. One or more of the multiple processors may be coupled with one or more of the multiple memories, which may, individually or collectively, be configured to perform various functions herein.

The one or more ALUs 1506 may be configured to support various operations in accordance with examples as described herein. In some implementations, the one or more ALUs 1506 may reside within or on a processor chipset (e.g., the processor 1500). In some other implementations, the one or more ALUs 1506 may reside external to the processor chipset (e.g., the processor 1500). One or more ALUs 1506 may perform one or more computations such as addition, subtraction, multiplication, and division on data. For example, one or more ALUs 1506 may receive input operands and an operation code, which determines an operation to be executed. One or more ALUs 1506 may be configured with a variety of logical and arithmetic circuits, including adders, subtractors, shifters, and logic gates, to process and manipulate the data according to the operation. Additionally, or alternatively, the one or more ALUs 1506 may support logical operations such as AND, OR, exclusive-OR (XOR), not-OR (NOR), and not-AND (NAND), enabling the one or more ALUs 1506 to handle conditional operations, comparisons, and bitwise operations.

The processor 1500 may support wireless communication in accordance with examples as disclosed herein. The processor 1500 may be configured to or operable to support at least one controller (e.g., the controller 1502) coupled with at least one memory (e.g., the memory 1504) and configured to cause the processor to communicate a registration request message for registration of a UE to a wireless communication network, the registration request message including a credentials indication associated with a credential; receive a response message including a presentation policy for registration to the wireless communication network; communicate a presentation token generated based at least in part on the presentation policy, the presentation token including proof information for a private key; receive an authentication challenge; and generate, based at least in part on the authentication challenge, an authentication result using a root key and a subscription identity from the credential.

Additionally, the processor 1500 may be configured to or operable to support any one or combination of where the registration request message includes a NAS registration request message and the response message include a NAS response message; the credentials indication includes an anonymous SUCI including a NAI for the wireless communication network; the presentation policy includes an indication to provide an encrypted subscription identifier, an encrypted root key, and a public key; the private key is associated with a public key included in the presentation token; the at least one controller is configured to cause the processor to communicate the presentation token via a NAS request, and receive a NAS response including the authentication challenge and a presentation token success indication; the at least one controller is configured to cause the processor to derive the root key and the subscription identity; the root key and the subscription identity are included in the credential in an encrypted form, and wherein the at least one controller is configured to cause the processor to decrypt the root key and the subscription identity using the private key; the at least one controller is configured to cause the processor to perform a registration procedure with the wireless communication network based at least in part on the authentication result.

Figure 16:
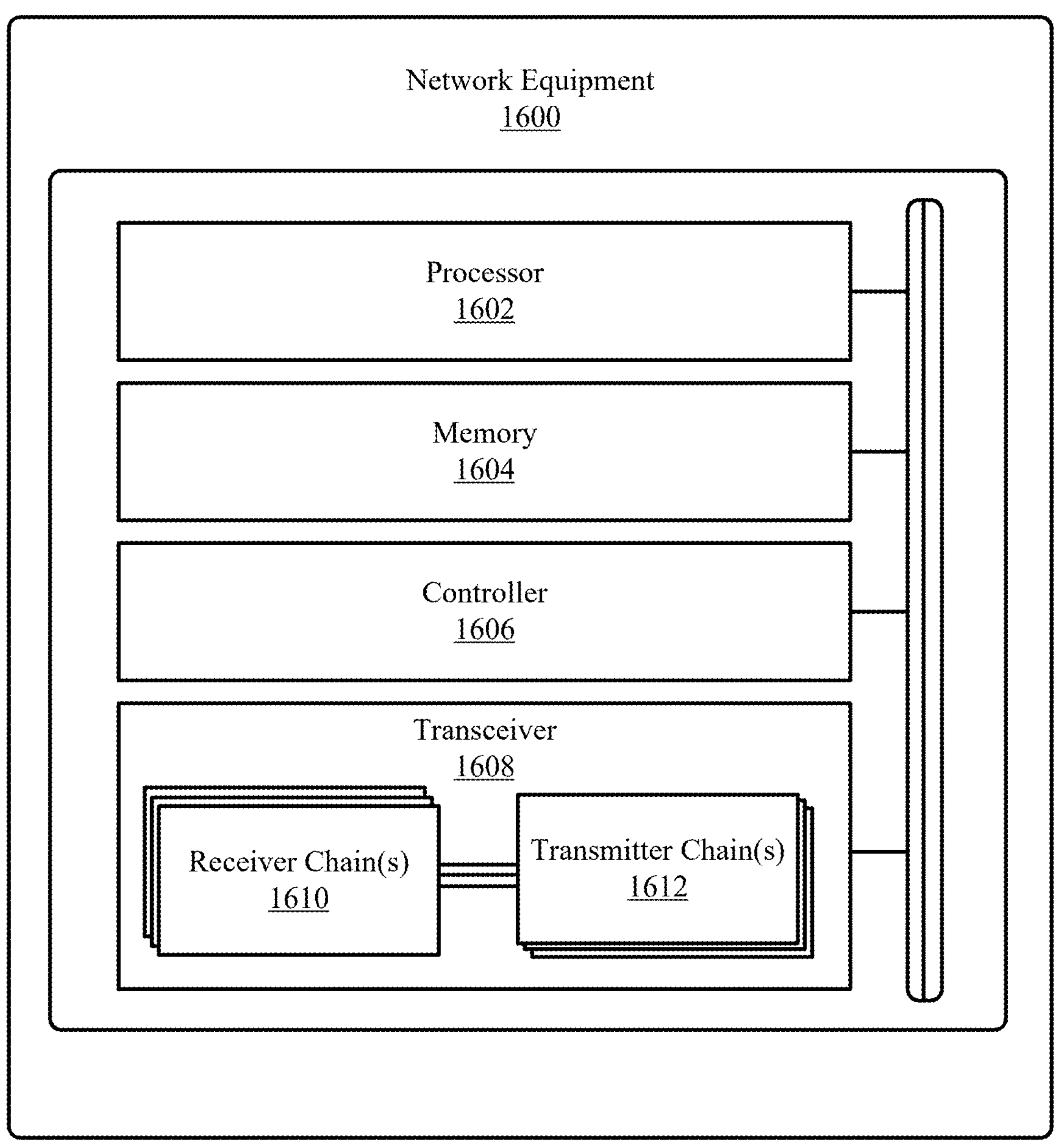
FIG. 16 illustrates an example of a NE 1600 in accordance with aspects of the present disclosure.

FIG. 16 illustrates an example of a NE 1600 in accordance with aspects of the present disclosure. The NE 1600 may include a processor 1602, a memory 1604, a controller 1606, and a transceiver 1608. The processor 1602, the memory 1604, the controller 1606, or the transceiver 1608, or various combinations thereof or various components thereof may be examples of means for performing various aspects of the present disclosure as described herein. These components may be coupled (e.g., operatively, communicatively, functionally, electronically, electrically) via one or more interfaces.

The processor 1602, the memory 1604, the controller 1606, or the transceiver 1608, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1602 may include an intelligent hardware device (e.g., a general-purpose processor, a DSP, a CPU, an ASIC, an FPGA, or any combination thereof). In some implementations, the processor 1602 may be configured to operate the memory 1604. In some other implementations, the memory 1604 may be integrated into the processor 1602. The processor 1602 may be configured to execute computer-readable instructions stored in the memory 1604 to cause the NE 1600 to perform various functions of the present disclosure.

The memory 1604 may include volatile or non-volatile memory. The memory 1604 may store computer-readable, computer-executable code including instructions when executed by the processor 1602 cause the NE 1600 to perform various functions described herein. The code may be stored in a non-transitory computer-readable medium such as the memory 1604 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1602 and the memory 1604 coupled with the processor 1602 may be configured to cause the NE 1600 to perform one or more of the functions described herein (e.g., executing, by the processor 1602, instructions stored in the memory 1604). For example, the processor 1602 may support wireless communication at the NE 1600 in accordance with examples as disclosed herein. The NE 1600 may be configured to or operable to support a means for receiving a registration request message for registration of a UE to a wireless communication network, the registration request message including a credentials indication associated with a credential; communicating a response message including a presentation policy for registration to the wireless communication network; receiving a presentation token generated based at least in part on the presentation policy, the presentation token including proof information for a private key; receiving, based at least in part on the presentation token, an authentication challenge; and communicating, to the UE, the authentication challenge associated with registration of the UE to the wireless communication network.

Additionally, or alternatively, the NE 1600 may support at least one memory (e.g., the memory 1604) and at least one processor (e.g., the processor 1602) coupled with the at least one memory and configured to cause the NE to receive a registration request message for registration of a UE to a wireless communication network, the registration request message including a credentials indication associated with a credential; communicate a response message including a presentation policy for registration to the wireless communication network; receive a presentation token generated based at least in part on the presentation policy, the presentation token including proof information for a private key; receive, based at least in part on the presentation token, an authentication challenge; and communicate, to the UE, the authentication challenge associated with registration of the UE to the wireless communication network.

The controller 1606 may manage input and output signals for the NE 1600. The controller 1606 may also manage peripherals not integrated into the NE 1600. In some implementations, the controller 1606 may utilize an operating system such as iOS®, ANDROID®, WINDOWS®, or other operating systems. In some implementations, the controller 1606 may be implemented as part of the processor 1602.

In some implementations, the NE 1600 may include at least one transceiver 1608. In some other implementations, the NE 1600 may have more than one transceiver 1608. The transceiver 1608 may represent a wireless transceiver. The transceiver 1608 may include one or more receiver chains 1610, one or more transmitter chains 1612, or a combination thereof.

A receiver chain 1610 may be configured to receive signals (e.g., control information, data, packets) over a wireless medium. For example, the receiver chain 1610 may include one or more antennas to receive a signal over the air or wireless medium. The receiver chain 1610 may include at least one amplifier (e.g., a low-noise amplifier (LNA)) configured to amplify the received signal. The receiver chain 1610 may include at least one demodulator configured to demodulate the receive signal and obtain the transmitted data by reversing the modulation technique applied during transmission of the signal. The receiver chain 1610 may include at least one decoder for decoding the demodulated signal to receive the transmitted data.

A transmitter chain 1612 may be configured to generate and transmit signals (e.g., control information, data, packets). The transmitter chain 1612 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1612 may also include at least one power amplifier configured to amplify the modulated signal to an appropriate power level suitable for transmission over the wireless medium. The transmitter chain 1612 may also include one or more antennas for transmitting the amplified signal into the air or wireless medium.

Figure 17:
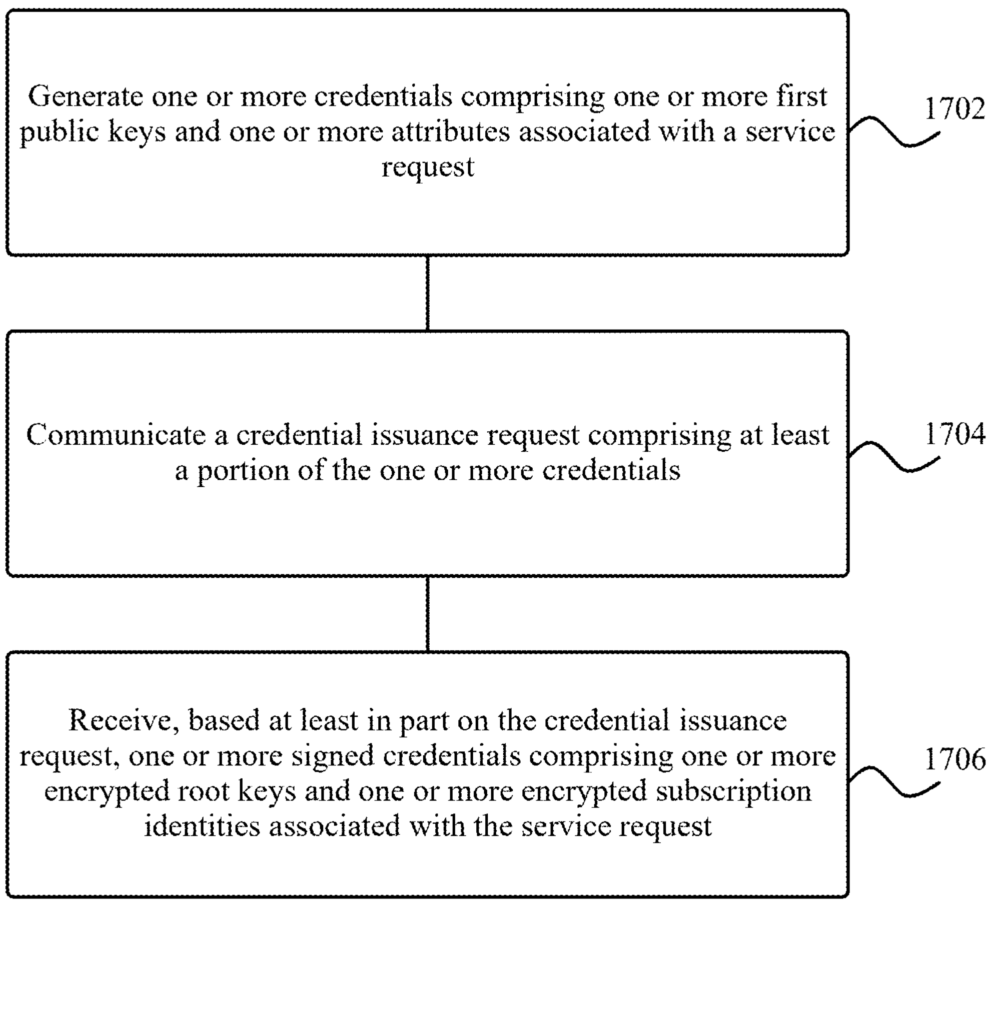
FIG. 17 illustrates a flowchart of a method 1700 in accordance with aspects of the present disclosure.

FIG. 17 illustrates a flowchart of a method 1700 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 1702, the method may include generating one or more credentials comprising one or more first public keys and one or more attributes associated with a service request. The operations of 1702 may be performed in accordance with examples as described herein. In some implementations, aspects of the operations of 1702 may be performed by a UE as described with reference to FIG. 14.

At 1704, the method may include communicating a credential issuance request comprising at least a portion of the one or more credentials. The operations of 1704 may be performed in accordance with examples as described herein. In some implementations, aspects of the operations of 1704 may be performed by a UE as described with reference to FIG. 14.

At 1706, the method may include receiving, based at least in part on the credential issuance request, one or more signed credentials comprising one or more encrypted root keys and one or more encrypted subscription identities associated with the service request. The operations of 1706 may be performed in accordance with examples as described herein. In some implementations, aspects of the operations of 1706 may be performed a UE as described with reference to FIG. 14.

Figure 18:
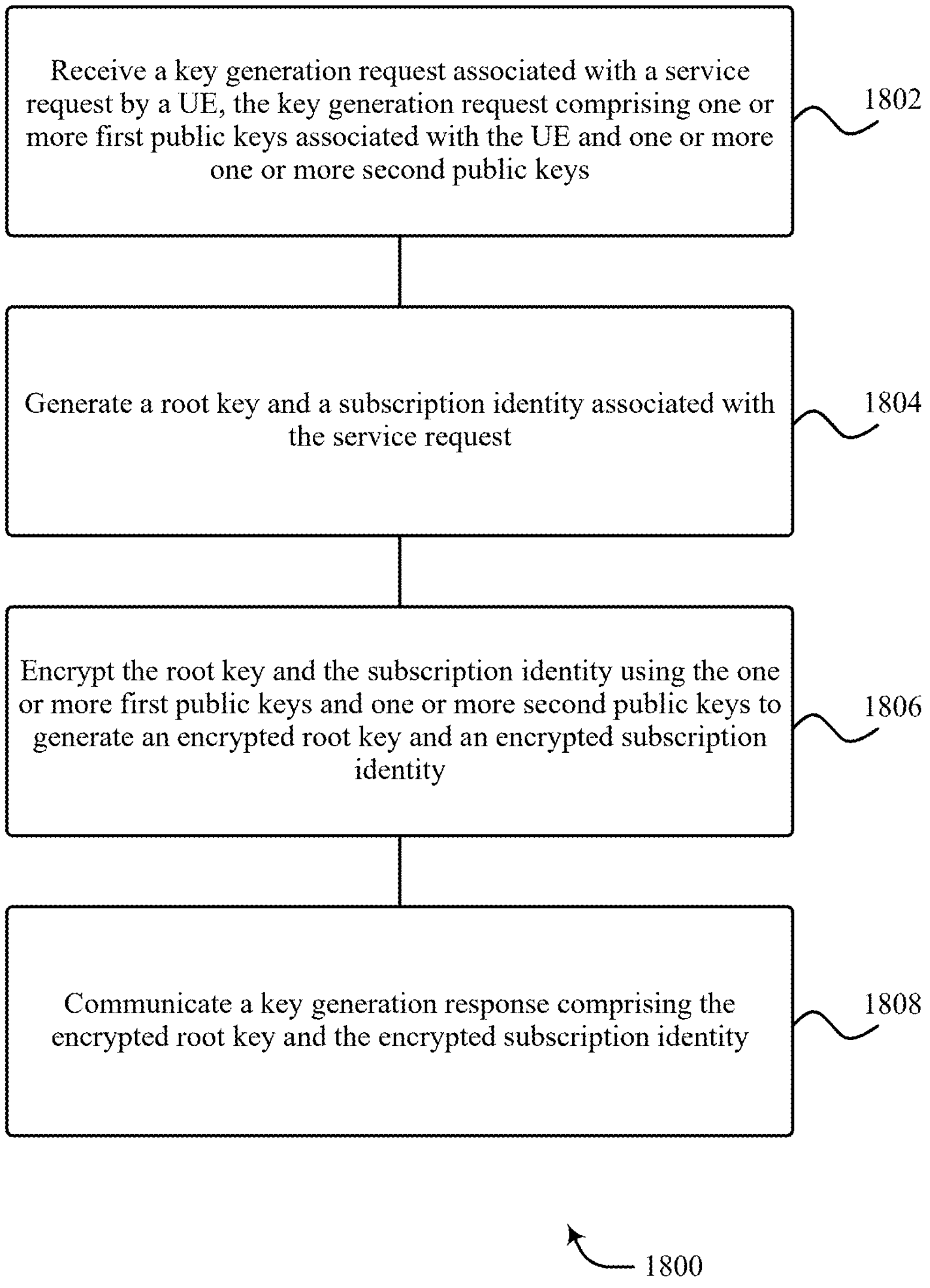
FIG. 18 illustrates a flowchart of a method 1800 in accordance with aspects of the present disclosure.

FIG. 18 illustrates a flowchart of a method 1800 in accordance with aspects of the present disclosure. The operations of the method may be implemented by a NE as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 1802, the method may include receiving a key generation request associated with a service request by a UE, the key generation request comprising one or more first public keys associated with the UE and one or more one or more second public keys. The operations of 1802 may be performed in accordance with examples as described herein. In some implementations, aspects of the operations of 1802 may be performed by a NE as described with reference to FIG. 16.

At 1804, the method may include generating a root key and a subscription identity associated with the service request. The operations of 1804 may be performed in accordance with examples as described herein. In some implementations, aspects of the operations of 1804 may be performed by a NE as described with reference to FIG. 16.

At 1806, the method may include encrypting the root key and the subscription identity using the one or more first public keys and one or more second public keys to generate an encrypted root key and an encrypted subscription identity. The operations of 1806 may be performed in accordance with examples as described herein. In some implementations, aspects of the operations of 1806 may be performed a NE as described with reference to FIG. 16.

At 1808, the method may include communicating a key generation response comprising the encrypted root key and the encrypted subscription identity. The operations of 1808 may be performed in accordance with examples as described herein. In some implementations, aspects of the operations of 1808 may be performed a NE as described with reference to FIG. 16.

Figure 19:
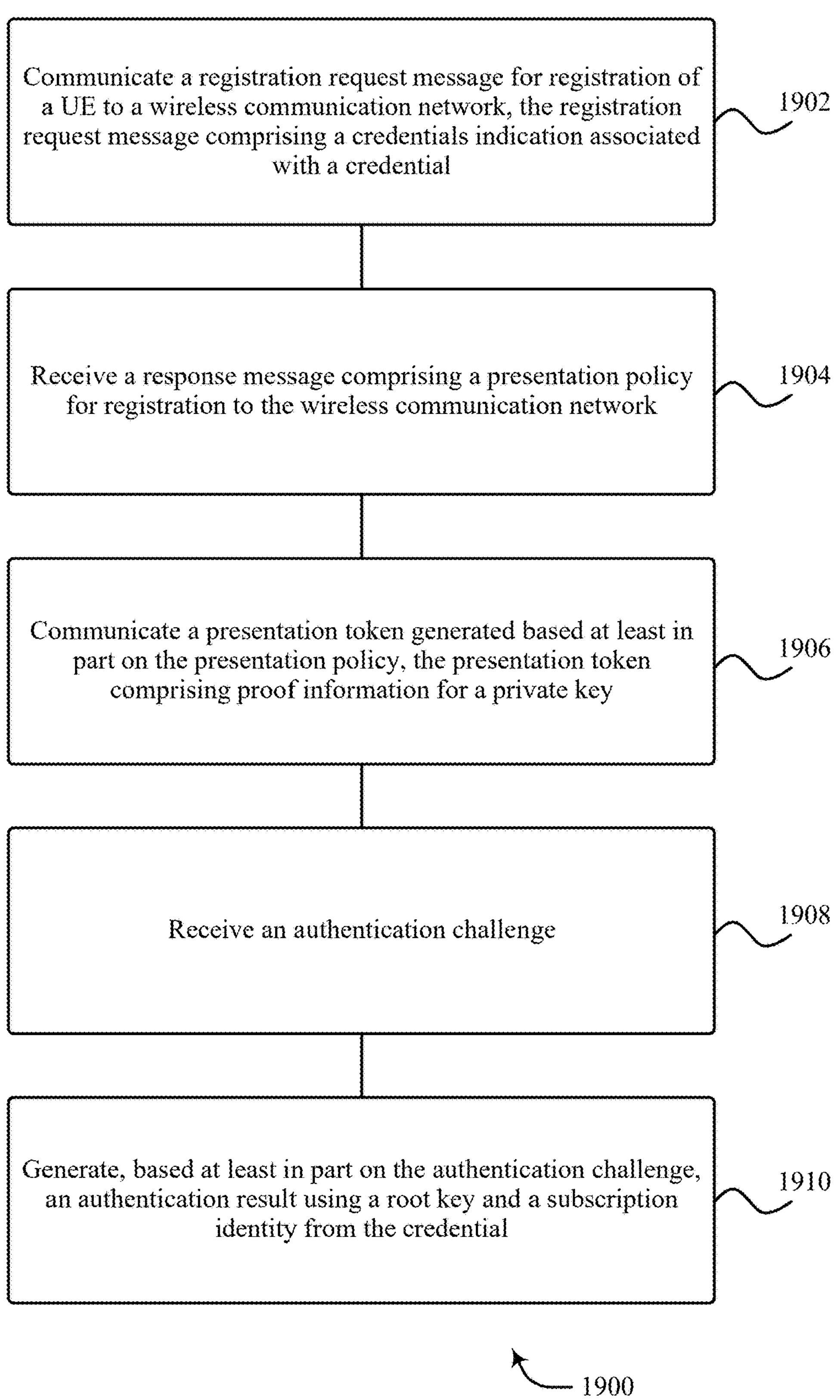
FIG. 19 illustrates a flowchart of a method 1900 in accordance with aspects of the present disclosure.

FIG. 19 illustrates a flowchart of a method 1900 in accordance with aspects of the present disclosure. The operations of the method may be implemented by a UE as described herein. In some implementations, the UE may execute a set of instructions to control the function elements of the UE to perform the described functions. It should be noted that the method described herein describes a possible implementation, and that the operations and the steps may be rearranged or otherwise modified and that other implementations are possible.

At 1902, the method may include communicating a registration request message for registration of a UE to a wireless communication network, the registration request message comprising a credentials indication associated with a credential. The operations of 1902 may be performed in accordance with examples as described herein. In some implementations, aspects of the operations of 1902 may be performed by a UE as described with reference to FIG. 14.

At 1904, the method may include receiving a response message comprising a presentation policy for registration to the wireless communication network. The operations of 1904 may be performed in accordance with examples as described herein. In some implementations, aspects of the operations of 1904 may be performed by a UE as described with reference to FIG. 14.

At 1906, the method may include communicating a presentation token generated based at least in part on the presentation policy, the presentation token comprising proof information for a private key. The operations of 1906 may be performed in accordance with examples as described herein. In some implementations, aspects of the operations of 1906 may be performed a UE as described with reference to FIG. 14.

At 1908, the method may include receiving an authentication challenge. The operations of 1908 may be performed in accordance with examples as described herein. In some implementations, aspects of the operations of 1908 may be performed a UE as described with reference to FIG. 14.

At 1910, the method may include generating, based at least in part on the authentication challenge, an authentication result using a root key and a subscription identity from the credential. The operations of 1910 may be performed in accordance with examples as described herein. In some implementations, aspects of the operations of 1910 may be performed a UE as described with reference to FIG. 14.

Figure 20:
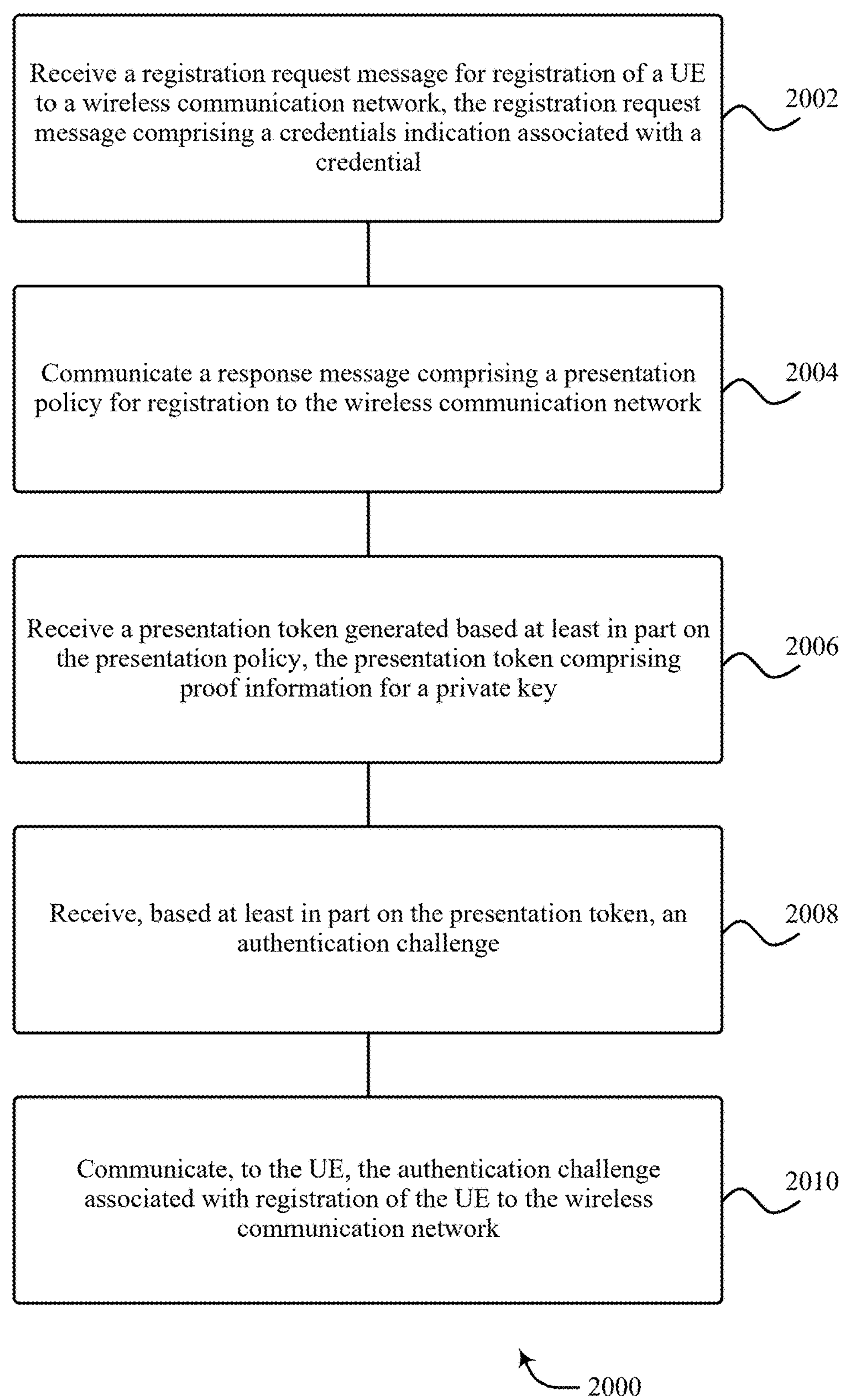
FIG. 20 illustrates a flowchart of a method 2000 in accordance with aspects of the present disclosure.

FIG. 20 illustrates a flowchart of a method 2000 in accordance with aspects of the present disclosure. The operations of the method may be implemented by a NE as described herein. In some implementations, the NE may execute a set of instructions to control the function elements of the NE to perform the described functions. It should be noted that the method described herein describes a possible implementation, and that the operations and the steps may be rearranged or otherwise modified and that other implementations are possible.

At 2002, the method may include receiving a registration request message for registration of a UE to a wireless communication network, the registration request message comprising a credentials indication associated with a credential. The operations of 2002 may be performed in accordance with examples as described herein. In some implementations, aspects of the operations of 2002 may be performed by a NE as described with reference to FIG. 16.

At 2004, the method may include communicating a response message comprising a presentation policy for registration to the wireless communication network. The operations of 2004 may be performed in accordance with examples as described herein. In some implementations, aspects of the operations of 2004 may be performed by a NE as described with reference to FIG. 16.

At 2006, the method may include receiving a presentation token generated based at least in part on the presentation policy, the presentation token comprising proof information for a private key. The operations of 2006 may be performed in accordance with examples as described herein. In some implementations, aspects of the operations of 2006 may be performed a NE as described with reference to FIG. 16.

At 2008, the method may include receiving, based at least in part on the presentation token, an authentication challenge. The operations of 2008 may be performed in accordance with examples as described herein. In some implementations, aspects of the operations of 2008 may be performed a NE as described with reference to FIG. 16.

At 2010, the method may include communicating, to the UE, the authentication challenge associated with registration of the UE to the wireless communication network. The operations of 2010 may be performed in accordance with examples as described herein. In some implementations, aspects of the operations of 2010 may be performed a NE as described with reference to FIG. 16.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

communicate a registration request message for registration of the UE to a wireless communication network, the registration request message comprising a credentials indication associated with a credential;

receive a response message comprising a presentation policy for registration to the wireless communication network, the presentation policy comprising an indication to provide an encrypted subscription identifier, an encrypted root key, and a public key;

communicate a presentation token generated based at least in part on the presentation policy, the presentation token comprising proof information for a private key;

receive an authentication challenge;

generate, based at least in part on the authentication challenge, an authentication result using a root key and a subscription identity from the credential; and perform a registration procedure with the wireless communication network based at least in part on the authentication result.

2. The UE of claim 1, wherein the registration request message comprises a non-access stratum (NAS) registration request message and the response message comprise a NAS response message.

3. The UE of claim 1, wherein the credentials indication comprises an anonymous subscription concealed identifier (SUCI) comprising a network access identifier (NAI) for the wireless communication network.

4. The UE of claim 1, wherein the private key is associated with a public key included in the presentation token.

5. The UE of claim 1, wherein the at least one processor is configured to cause the UE to communicate the presentation token via a non-access stratum (NAS) request.

6. The UE of claim 1, wherein the at least one processor is configured to cause the UE to receive a non-access stratum (NAS) response comprising the authentication challenge and a presentation token success indication.

7. The UE of claim 1, wherein the at least one processor is configured to cause the UE to derive the root key and the subscription identity.

8. The UE of claim 1, wherein the root key and the subscription identity are included in the credential in an encrypted form, and wherein the at least one processor is configured to cause the UE to decrypt the root key and the subscription identity using the private key.

9. A processor for wireless communication, comprising:

at least one controller coupled with at least one memory and configured to cause the processor to:

communicate a registration request message for registration of a user equipment (UE) to a wireless communication network, the registration request message comprising a credentials indication associated with a credential;

receive a response message comprising a presentation policy for registration to the wireless communication network, the presentation policy comprising an indication to provide an encrypted subscription identifier, an encrypted root key, and a public key;

communicate a presentation token generated based at least in part on the presentation policy, the presentation token comprising proof information for a private key;

receive an authentication challenge;

generate, based at least in part on the authentication challenge, an authentication result using a root key and a subscription identity from the credential; and perform a registration procedure for the UE with the wireless communication network based at least in part on the authentication result.

10. The processor of claim 9, wherein the registration request message comprises a non-access stratum (NAS) registration request message and the response message comprise a NAS response message.

11. The processor of claim 9, wherein the credentials indication comprises an anonymous subscription concealed identifier (SUCI) comprising a network access identifier (NAI) for the wireless communication network.

12. The processor of claim 9, wherein the private key is associated with a public key included in the presentation token.

13. The processor of claim 9, wherein the at least one controller is configured to cause the processor to communicate the presentation token via a non-access stratum (NAS) request, and receive a non-access stratum (NAS) response comprising the authentication challenge and a presentation token success indication.

14. The processor of claim 9, wherein the at least one controller is configured to cause the processor to derive the root key and the subscription identity.

15. The processor of claim 9, wherein the root key and the subscription identity are included in the credential in an encrypted form, and wherein the at least one controller is configured to cause the processor to decrypt the root key and the subscription identity using the private key.

16. A network equipment for wireless communication, comprising:

at least one memory; and at least one processor coupled with the at least one memory and configured to cause the network equipment to:

receive a registration request message for registration of a user equipment (UE) to a wireless communication network, the registration request message comprising a credentials indication associated with a credential;

communicate a response message, to the UE, comprising a presentation policy for registration to the wireless communication network, the presentation policy comprising an indication to provide an encrypted subscription identifier, an encrypted root key, and a public key;

receive a presentation token generated based at least in part on the presentation policy, the presentation token comprising proof information for a private key;

receive, based at least in part on the presentation token, an authentication challenge; and communicate, to the UE, the authentication challenge associated with registration of the UE to the wireless communication network.

17. A method performed by a user equipment (UE), the method comprising:

communicating a registration request message for registration of the UE to a wireless communication network, the registration request message comprising a credentials indication associated with a credential;

receiving a response message comprising a presentation policy for registration to the wireless communication network, the presentation policy comprising an indication to provide an encrypted subscription identifier, an encrypted root key, and a public key;

communicating a presentation token generated based at least in part on the presentation policy, the presentation token comprising proof information for a private key;

receiving an authentication challenge;

generating, based at least in part on the authentication challenge, an authentication result using a root key and a subscription identity from the credential; and performing a registration procedure with the wireless communication network based at least in part on the authentication result.

18. The method of claim 17, wherein the registration request message comprises a non-access stratum (NAS) registration request message and the response message comprise a NAS response message.

19. The method of claim 17, wherein the credentials indication comprises an anonymous subscription concealed identifier (SUCI) comprising a network access identifier (NAI) for the wireless communication network.

20. The method of claim 17, wherein the root key and the subscription identity are included in the credential in an encrypted form, the method further comprising decrypting the root key and the subscription identity using the private key.

* * * * *